United States Patent [19]

Itoh et al.

[11] Patent Number: 4,935,763
[45] Date of Patent: Jun. 19, 1990

[54] CAMERA HAVING A ZOOM LENS UNIT

[75] Inventors: Masatoshi Itoh; Hidenori Fukuoka; Kazuhiko Kojima, all of Osaka, Japan

[73] Assignee: Minolta Camera Kabushiki Kaisha, Osaka, Japan

[21] Appl. No.: 372,237

[22] Filed: Jun. 26, 1989

[30] Foreign Application Priority Data

| Feb. 2, 1987 | [JP] | Japan | 62-22134 |
| Feb. 2, 1987 | [JP] | Japan | 62-22135 |
| Feb. 7, 1987 | [JP] | Japan | 62-26876 |
| Feb. 7, 1987 | [JP] | Japan | 62-26877 |
| Feb. 10, 1987 | [JP] | Japan | 62-28563 |
| Feb. 18, 1987 | [JP] | Japan | 62-35395 |

[51] Int. Cl.$^5$ .................................................. G03B 3/00
[52] U.S. Cl. .................................... 354/400; 354/402; 354/195.1; 358/227
[58] Field of Search ............... 354/400, 402, 195.1, 354/195.11, 195.12; 358/227

[56] References Cited

U.S. PATENT DOCUMENTS

| 3,972,056 | 7/1976 | Tsujimoto et al. . | |
| 4,043,642 | 8/1977 | Hirose et al. | 354/195.1 |
| 4,183,639 | 1/1980 | Suwa . | |
| 4,541,695 | 9/1985 | Wainwright et al. . | |
| 4,572,624 | 4/1986 | Yamamoto et al. . | |
| 4,589,031 | 5/1986 | Tsuji . | |
| 4,618,235 | 10/1986 | Ishida et al. . | |
| 4,697,891 | 10/1987 | Kawai | 354/402 |
| 4,705,380 | 11/1987 | Yamamoto et al. | 354/402 |
| 4,728,980 | 3/1988 | Nakamura et al. | 354/402 |
| 4,735,494 | 4/1988 | Makino et al. . | |
| 4,748,509 | 5/1988 | Otake et al. | 354/400 |
| 4,766,302 | 8/1988 | Ishida et al. . | |

FOREIGN PATENT DOCUMENTS

| 56-162728 | 12/1981 | Japan . |
| 57-118203 | 7/1982 | Japan . |
| 59-67505 | 4/1984 | Japan . |
| 60-183877 | 9/1985 | Japan . |
| 60-183879 | 9/1985 | Japan . |

Primary Examiner—Russell E. Adams
Attorney, Agent, or Firm—Price, Gess & Ubell

[57] ABSTRACT

When a variator lens is driven to effect zooming, focal length information of a zoom lens unit, a zooming direction and a defocus amount are detector. Integration in CCD for focus detection is regulated in a short time during zooming and a cycle of focus detection is set to a predetermined period. A moving speed of a compensator lens is controlled based on detected information. A moving range of the variator lens is divided into zones and a basic moving speed of the compensator lens is set for each zone. When the variator lens is driven and information obtained by focus detection or a zooming condition corresponds to a specified condition, the compensator lens is moved at a basic speed corresponding to the zone where the variator lens exists or at a moving speed of the compensator lens applied till then. Focus detection areas automatically changed dependent on a situation of an object are forbidden to be changed during zooming. In addition, a focus detection are indicating mark displayed in a finder of the camera is fixed and unchanged during zooming irrespective of actual change of the focus detection area.

40 Claims, 33 Drawing Sheets

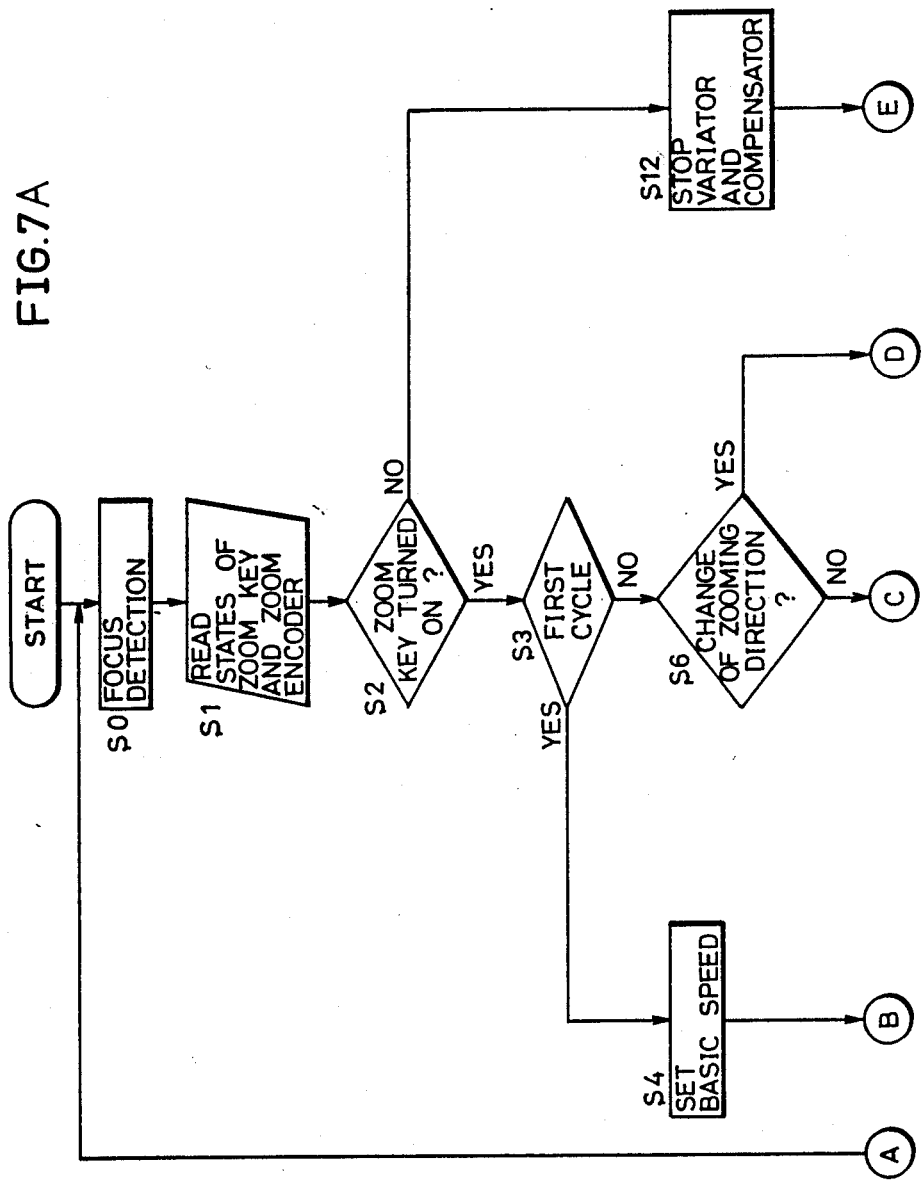

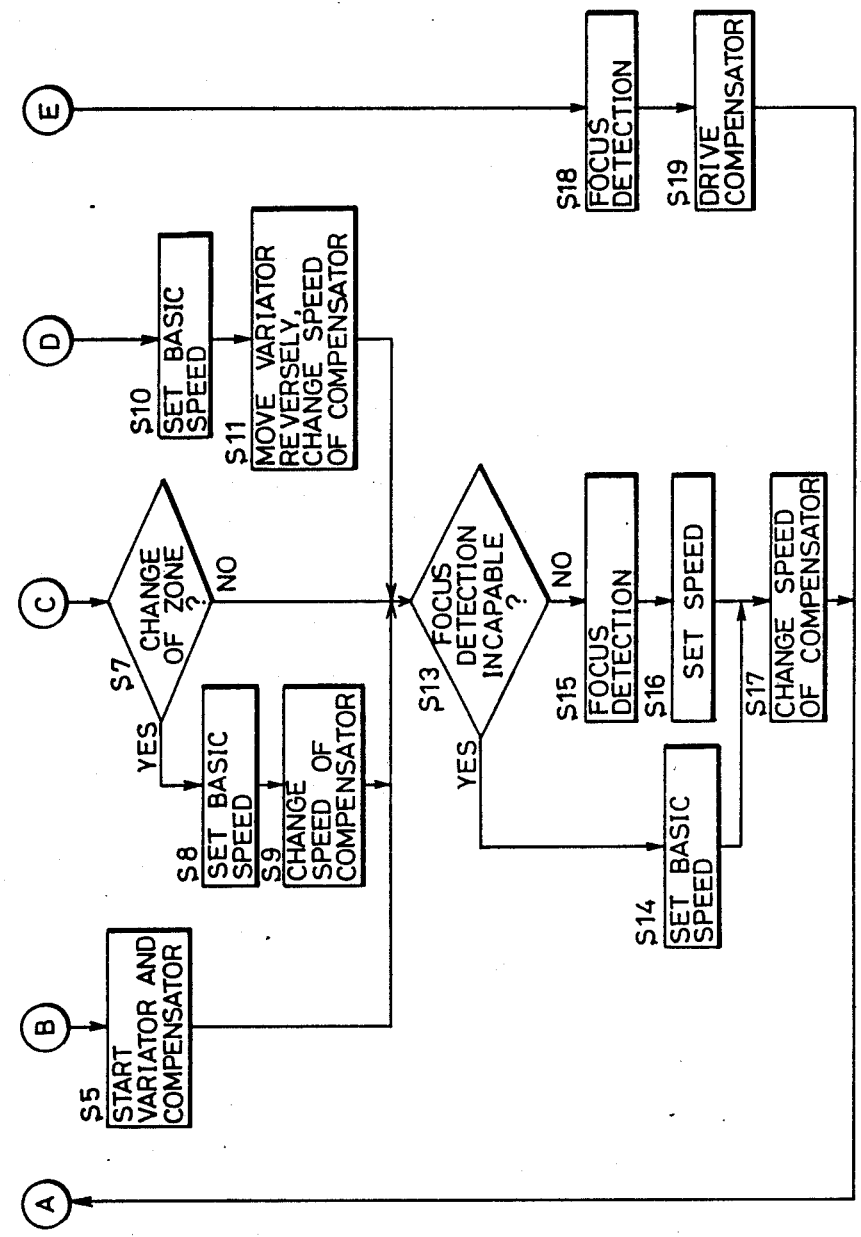

| ZONE | CODE |
|---|---|
| END OF TELE | 111 |
| ZONE ① | 101 |
| ZONE ② | 100 |
| ZONE ③ | 110 |
| ZONE ④ | 010 |
| ZONE ⑤ | 011 |
| ZONE ⑥ | 001 |
| END OF WIDE | 000 |

(a) CHANGE FROM BASIC SPEED
(IN ZONES ① TO ③)

(b) CHANGE FROM LOW SPEED
(IN ZONES ① TO ③)

(c) CHANGE FROM HIGH SPEED
(IN ZONES ① TO ③)

(d) CHANGE FROM BASIC SPEED
(IN ZONES ④ TO ⑥)

CAMERA HAVING A ZOOM LENS UNIT

This is a continuation of application Ser. No. 150,611, filed Feb. 1, 1988, now abandoned.

BACKGROUND OF THE INVENTION

1. Field of the Invention

The present invention relates to a camera having an automatic focusing function and particularly to an auto focus camera having a zooming mechanism.

2. Description of the Prior Art

In a conventional zoom lens, a distance between a variator lens and a compensator lens is generally regulated by a cam ring so that a focusing position of light from an object may be fixed independent of zooming operation. In such a zoom lens, focusing operation is performed by using a front lens.

The U.S. Pat. No. 2,782,683 discloses that a position of a variator lens and that of a compensator lens are detected by using sliding resistance, whereby a positional relation between the variator lens and the compensator lens is controlled without using a cam ring. In this U.S. Patent, sliding resistance means for detecting the positions of the lenses is required in place of the cam ring.

In addition, the Japanese Patent Publication No. 15226/1977 discloses a zoom lens which compensates for a shift of focus by controlling a position of a focus lens according to absolute focal length information of the zoom lens when zooming is effected after temporary manual focusing. However, this zoom lens is not associated with an auto focus apparatus. Accordingly, zooming operation is to be performed after the focus has been temporarily adjusted manually. In addition, absolute focal length information of the zoom lens is required and the position of the focus lens, not the moving speed thereof, is controlled. Therefore, this zoom lens cannot always ensure an in-focus condition during zooming.

As described above, in a zoom lens, a distance between a variator lens and a compensator lens is generally controlled by a cam ring so that a focusing position of light from an object may be fixed independent of zooming operation. However, in order to make a lens have a small size and a light weight, it is desirable to ensure an in-focus condition during zooming without using such a cam ring.

In a zoom lens for a single-lens reflex camera, an in-focus condition needs to be set only at the time of releasing the shutter and it is not necessary to maintain the in-focus condition during zooming. Accordingly, it is only necessary to control the position of the compensator lens based on the result of focus detection. However, in a video camera, zooming is effected during photographing operation and it is necessary to constantly maintain an in-focus condition during zooming.

On the other hand, there have been proposed several focus correction systems in which zooming is performed by a variator lens and movement of a focus position caused by the zooming is corrected by movement of a compensator lens. Types of such correction systems differ in what the movement of the compensator depends on. For example, the Japanese Patent Laying-Open No. 92127/1975 indicates that the compensator is moved based on an output of a focus detecting apparatus. On the other hand, the Japanese Patent Laying-Open No. 143309/1985 discloses that position information of the compensator necessary for setting an in-focus condition dependent on a change in a focal length caused by a movement of the variator is stored in a ROM and the position information is read out corresponding to the position of the variator so as to be used for control of the movement of the compensator.

However, the above described method of the Japanese Patent Laying-Open No. 143309/1985 requires a ROM of a large capacity for attaining a high precision of focus correction and this method is not a practical method.

On the other hand, the method described in the Japanese Patent Laying-Open No. 92127/1975 is simple in construction since it is only necessary to detect a defocus condition of a focal plane and to drive the compensator based on the detected condition. However, if this method is applied to a video camera, the following disadvantages are involved. More specifically, if focus correction (compensation for a shift of focus) during zooming is considered, dynamic correction characteristics (that is, those characteristics during zooming) becomes particularly important to the video camera as described above. This will be explained with reference to FIG. 1. A TTL passive type focus detecting apparatus as disclosed in the Japanese Patent Laying-Open No. 4914/1985 for example, that is, a focus detecting apparatus of the so-called phase difference detection system is well known as a focus detecting apparatus for detecting a defocus condition on a focusing surface. However, this detecting apparatus is of a charge integration or accumulation type and it causes a time lag corresponding to a period elapsed after integration a charge representing an amount of light from an object until an end of focus detecting calculation. Such time lag is also caused in a focus detecting apparatus of a contrast type. FIG. 1 represents a follow-up or tracking characteristic of a compensator during zooming in a focus compensated apparatus using a focus detecting system causing such time lag, in which zooming is effected from an end of a telephoto range (referred to hereinafter as the tele end) in a direction opposite to the tele end (referred to hereinafter as the wide direction, an end opposite to the tele end of the telephoto range being afterwards referred to as the wide end and a direction toward the tele end being afterwards referred to as the tele direction). The abscissa in FIG. 1 represents a elapse of time after the zooming operation, not a focal length and the ordinate represents a movement amount of the compensator. In the figure, the curve A is an ideal follow-up curve of the compensator and the lines B indicate a follow-up locus of compensator based on a signal of the focus detecting apparatus. It is assumed that the curve A shows a characteristic exhibited when the distance D to the object is $D = \infty$. The waveform P shown below the abscissa represents and integration time control pulse for focus detection. A period of a high level of the pulse corresponds to an integration time and a period of a low level thereof corresponds to a focus detecting calculation time. Although the integration time is actually changed dependent on luminance of an object, it is assumed in the figure that the integration time is fixed for simplification of the explanation.

Referring in FIG. 1, assuming that the compensator is first located at a position corresponding to the time T0, the variator is in a stopped state at the time T0 and the compensator is in a stopped state with an in-focus condition being maintained by the focus detecting apparatus. Then, when zooming is started in the wide direction, the variator is moved in the wide direction and focus detection is continued until the time T1. Assuming that zooming and integration are started simultaneously for the purpose of simply explaining the focusing operation based on detection of a defocus amount during zooming, only the variator is moved in the wide direction with the compensator being stopped in a time period from T0 to T1. Accordingly, at T1 when the integration and the detecting calculation are terminated, the focus detecting apparatus detects an amount corresponding to DF1 in FIG. 1 as a defocus amount at an integration baricentric position during the integration (i.e., a center of the high-level period of the pulse P). Therefore, there is a time lag corresponding to a period from defocusing to detection of the defocus amount. When the defocus amount DF1 is detected at the time T1, the focus compensated (AF) apparatus enables the compensator to start to be moved at a given speed by an amount corresponding to DF1. It is assumed in this case that the given speed is equal to a focus control speed at the time of normal AF operation without zooming and corresponds to the maximum inclination of the ideal follow-up curve A. It is further assumed that after the time T1, focus detection is effected by moving the compensator so as to maintain a good follow-up characteristic.

As described above, the movement of the compensator is started when the defocusing is first detected at the time T1. If a defocus amount larger than DF1 is already caused at this time, the compensator is moved by the detected defocus amount DF1 and after that, an in-focus condition is regarded as being set and the movement of the compensator is stopped until the time T2. After the time T1, the subsequent integration is started and a defocus amount DF2 is detected at the time T2 in the same manner, whereby the compensator starts to be moved by an amount corresponding to DF in the same direction at the time T2. Then, at the time T3, a defocus amount DF3 is detected and integration is effected while the compensator is being moved. When correction for an amount already obtained, that is, evaluation of DF3–DF3' is effected, the compensator is stopped again at a position shown in the figure at the time T4. In the same manner, defocus amounts DF4 to DF9 are detected at the times T4 to T9, respectively, and the compensator is moved and stopped repeatedly in the same direction at the same speed as previously set. As a result, a large error is caused by delays in follow-up as shown in the figure and a motion picture obtained is of a considerably poor quality. This drawback becomes particularly conspicuous in the case of a video camera. However, even in the case of a conventional camera with film, the same phenomenon occurs if pictures are successively taken during zooming. In order to minimize the error in follow-up, it is possible to shorten each detection cycle of the focus detecting apparatus. However, for that purpose, it is necessary to increase the sensitivity of a light receiving element to reduce an integration time, or to use a processing unit having a high speed of calculation. In such cases, the costs are unavoidably increased. Furthermore, if such measures are taken, it is impossible in the above described conventional focus detection method to effectively reduce the errors in follow-up as shown in FIG. 1. Particularly, it is difficult to avoid an excessive defocus caused by a delay in follow-up at the start of zooming or a delay in follow-up at the time of reversing the zooming direction. A method for improving the follow-up characteristic is proposed for example in the Japanese Patent Laying-Open No. 264307/1986, in which moving speeds of a compensator are preset for the respective zones of distances to an object and the compensator is controlled by selecting any of the preset moving speeds at the time of zooming. Although this method is effectively applied when zooming is made in the same direction, it does not take account of other cases such as reversing of the zooming direction, a rapid change in information of distance to the object or a case in which focus detection is incapable. Thus, in such cases, the follow-up characteristic is deteriorated and it takes time to attain suitable focus correction.

In addition, cameras of the latest models perform focus detection in AF operation and a TTL passive type phase difference detection system, a contrast system and the like are adopted in those cameras. According to such systems, charge generated by incidence of light from an object is stored to perform integration and an output of the integration is used for focus detection. Such systems have an advantage that a sufficiently large detection signal suitable for processing can be obtained. However, the output value of the integration attains a predetermined level rapidly or at a considerably slow speed, dependent on luminance of the object. If the output value of the integration attains the predetermined level at a too slow speed, the follow-up characteristic with respect to the object is deteriorated and a shutter chance is often missed. In view of those disadvantages, the Japanese Patent Laying-Open No. 260261/1986 discloses that if an output of integration does not attain a predetermined level within a predetermined period, the integration operation is stopped, so that gain correction is made with an amplification degree according to the output of the integration.

However, this prior art takes no account of a focus operation relationship with a zooming operation. During zooming, there are brought about various conditions such as a change in an object image, blurring of picture due to an unsteady hold on the camera, or a difficulty in focusing on an object. If the integration time in a focus detection means is long, the tendency of deviation or the difficulty in focusing on the object is further increased. As a result, errors are produced in the integration output with high probability or the number of focus detection cycles repeated per unit time is decreased to cause deterioration in the follow-up characteristic for compensation for a change in a focusing position. Thus, particularly in the case of a video camera, an out-of-focus condition is often brought about during zooming and an unsatisfactory video image is obtained. In addition, even in a conventional camera with film, unsatisfactory results are brought about when pictures are successively taken during zooming.

In addition, there is proposed a camera for manually selecting a focus detection area for AF operation and also manually selecting a focus detection area indicating pattern to be displayed in a finder. However, such a manual selection system involves troublesome operation and it further has a disadvantage in that it is difficult to set a suitable focus detection area according to a situation of an object. Under the circumstances, there is proposed a camera for automatically selecting a focus detection area and a focus detection area indicating pattern to be displayed in a finder according to a situation of an object, for example, when focus detection is incapable.

However, such a camera for automatically selecting a focus detection area according to a situation of an object involves disadvantages as described below during zooming operation for moving a variator to change a focal length in a zoom lens unit. During zooming, compared with a stopped state of the variator, a view angle frequently changes to make it difficult to catch an object within an focus detection area located for example in the center of a photographing area, and blurring of picture due to an unsteady hold on the camera is liable to occur. Further, light from an object applied to a light receiving element for focus detection becomes unstable due to the change of the view angle, causing irregularities in the results of focus detection and it often happens that focus detection is incapable. If focus detection is incapable, switching is made to focus detection area having a different range and a focus detection area indicating mark is changed corresponding thereto. If such switching occurs frequently, it presents considerable difficulties in observing images in the finder.

In addition, if such switching occurs frequently, a focus detection time is prolonged by a period required for the switching, causing a further lowering in focusing precision.

SUMMARY OF THE INVENTION

An object of the present invention is to provide a camera for controlling a moving speed of a compensator lens according to a moving direction of a variator lens.

In order to attain the above described object, a camera having a zoom lens unit in accordance with the present invention comprises: light receiving means for receiving light from an object; a first lens fixed in a position at a predetermined forward distance from a light receiving portion of the light receiving means; a second lens as the variator lens movable between the first lens and the light receiving portion; first drive means for moving the second lens; a third lens as the compensator lens movable between the second lens and the light receiving portion, the first, second and third lenses constituting the zoom lens uint, movement of the second lens by the first drive means changing a focal length of the zoom lens unit, and movement of the third lens adjusting a focusing of the zoom lens unit; change detecting means for detecting that the focal length of the zoom lens is being changed; direction detecting means responsive to an output of the change detecting means for detecting a moving direction of the second lens; movement determination means responsive at least to an output of the direction detecting means for determining a moving direction and a moving speed of the third lens; and second drive means for electrically driving the third lens based on an output of the movement determination means.

Thus, the camera having the zoom lens unit and constructed as described above makes it possible to constantly maintain an in-focus condition even during zooming, without using a coupling member such as a cam ring between the variator lens and the compensator lens. Consequently, the zoom lens unit having a zooming function can be made to have a light weight and a small size.

Another object of the present invention is to provide a camera for controlling a moving speed of a compensator lens dependent on a defocus direction due to movement of a variator lens.

In order to attain the above described object, the camera having a zoom lens unit in accordance with the present invention comprises: light receiving means for receiving light from an object; a first lens fixed in a position at a predetermined forward distance from a light receiving portion of the light receiving means; a second lens as the variator lens movable between the first lens and the light receiving portion; first drive means for moving the second lens; a third lens as the compensator lens movable between the second lens and the light receiving portion, the first, second and third lenses constituting the zoom lens unit, movement of the second lens by the first drive means changing a focal length of the zoom lens unit, and movement of the third lens adjusting a focusing of the zoom lens unit; change detecting means for detecting that the focal length of the zoom lens is being changed; defocus direction detecting means for detecting a direction of defocus with respect to the light receiving portion; movement determination means responsive at least to an output of the defocus direction detecting means for determining a moving direction and a moving speed of the third lens; and second drive means for electrically driving the third lens based on an output of the movement determination means.

Thus, the camera having the zoom lens unit and constructed as described above makes it possible to constantly maintain an in-focus condition even during zooming, without zooming a coupling member such as a cam ring between the variator lens and the compensator lens. Consequently, the zoom lens unit having a zooming function can be made to have a light weight and a small size.

A further object of the present invention is to provide a camera for controlling a moving speed of a compensator lens dependent on a defocus amount caused by movement of a variator lens.

In order to attain the above described object, the camera having a zoom lens unit in accordance with the present invention comprises: light receiving means for receiving light from an object; a first lens fixed in a position at a predetermined forward distance from a light receiving portion of the light receiving means; a second lens as the variator lens movable between the first lens and the light receiving portion; first drive means for moving the second lens; a third lens as the compensator lens movable between the second lens and the light receiving portion, the first, second and third lenses constituting the zoom lens unit, movement of the second lens by the first drive means changing a focal length of the zoom lens unit, and movement of the third lens adjusting a focusing of the zoom lens unit; change detecting means for detecting that the focal length of the zoom lens is being changed; defocus amount detecting means for detecting an amount of the defocus with respect to the light receiving portion for each cycle of a predetermined period; defocus change amount detecting means for detecting a difference between amounts of the defocus detected in the present and the last detection cycles by the defocus amount detecting means; movement determination means responsive at least to an output of the defocus amount detecting means obtained in the present detection cycle and an output of the defocus change amount detecting means for determining a moving direction and a moving speed of the third lens; and second drive means for electrically driving the third lens based on an output of the movement determination means.

Thus, the camera having the zoom lens unit and constructed as described above makes it possible to constantly maintain an in-focus condition even during zooming, without using a coupling member such as a cam ring between the variator lens and the compensator lens. Consequently, the zoom lens unit having a zooming function can be made to have a light weight and a small size.

A still further object of the present invention is to provide a camera for controlling a compensator lens at a basic speed when a defocus condition caused by movement of a variator lens corresponds to a predetermined condition.

In order to attain the above described object, the camera having a zoom lens unit in accordance with the present invention comprises: light receiving means for receiving light from an object; a first lens fixed in a position at a predetermined forward distance from a light receiving portion of the light receiving means; a second lens as the variator lens movable between the first lens and the light receiving portion; first drive means for moving the second lens; a third lens as the compensator lens movable between the second lens and the light receiving portion, the first, second and third lenses constituting the zoom lens unit, movement of the second lens by the first drive means changing a focal length of the zoom lens unit, and movement of the third lens adjusting a focusing of the zoom lens unit; change detecting means for detecting that the focal length of the zoom lens is being changed; movement determination means responsive to an output of the change detecting means for determining a moving direction and a moving speed of the third lens; focus detecting means for detecting a focus condition of the second lens; speed change means for changing the determined moving speed in response to an output of the focus detecting means when the focusing condition detected by the focus detecting means does not correspond to a specified condition, the determined moving speed being not changed when the detected condition corresponds to the specified condition; and second drive means for electrically driving the third lens based on the moving speed outputted by the speed change means.

The camera having the zoom lens unit and constructed as described above makes it possible to achieve suitable focus compensation in zooming, since the compensator lens is controlled in a manner suitable for follow-up even if the defocus condition corresponds to the predetermined condition.

A still further object of the present invention is to provide a camera for controlling a compensator lens at a basic speed when movement of a variator lens is changed in a specified manner.

In order to attain the above described object, the camera having a zoom lens unit in accordance with the present invention comprises: light receiving means for receiving light from an object; a first lens fixed in a position at a predetermined forward distance from a light receiving portion of the light receiving means; a second lens as the variator lens movaable between the first lens and the light receiving portion; first drive means for moving the second lens; a third lens as the compensator lens movable between the second lens and the light receiving portion, the first, second and third lenses constituting the zoom lens unit, movement of the second lens by the first drive means changing a focal length of the zoom lens unit, and movement of the third lens adjusting a focusing of the zoom lens unit; change detecting means for detecting that the focal length of the zoom lens is being changed; movement determination means responsive to an output of the change detecting means for determining a moving direction and a moving speed of the third lens; focus detecting means for detecting a focusing condition of the second lens; first speed change means responsive to an output of the focus detecting means for changing the determined moving speed; second speed change means for further changing the changed moving speed to the determined moving speed when a specified change occurs in the movement of the second lens, and maintaining the moving speed outputted by the first speed change means when the specified change does not occur; second drive means for electrically driving the third lens based on the moving speed outputted by the second speed change means.

The camera having the zoom lens unit and constructed as described above makes it possible to achieve suitable focus compensation in zooming, since the compensator lens is controlled in a manner suitable for follow-up even if the specified change is caused in the movement of the variator lens.

A still further object of the present invention is to provide a camera for limiting a maximum value of a period for charge storage by reception of light for focus detection, dependent on movement of a variator lens.

In order to attain the above described object, the camera having a zoom lens unit comprises: light receiving means for receiving light from an object; a first lens fixed in a position at a predetermined forward distance from a light receiving portion of the light receiving means; a second lens as the variator lens movable between the first lens and the light receiving portion; first drive means for moving the second lens; a third lens as the compensator lens movable between the second lens and the light receiving portion, the first, second and third lenses constituting the zoom lens unit, movement of the second lens by the first drive means changing a focal length of the zoom lens unit, and movement of the third lens adjusting a focusing of the zoom lens unit; change detecting means for detecting that the focal length of the zoom lens is being changed; focus detecting means including, light receiving means having an image pickup member of a charge accumulation type for receiving, in the image pickup member, at least part of light from the object to convert the received light to an electric signal, control means for controlling a charge accumulation period for receiving the light in the image pickup member within a range of a predetermined period, detecting means for detecting a focusing condition of the third lens based on the electric signal accumulated within the charge accumulation period, and limiting means responsive to an output of the change detecting means for limiting the charge accumulation period controlled by the control means to a period shorter than the predetermined period; and second drive means for electrically driving the third lens based on an output of the focus detecting means.

The camera having the zoom lens unit and constructed as described above makes it possible to improve a focusing precision and a follow-up characteristic with respect to the object during zooming, since the number of focus detection cycles with respect to the object per unit time is increased.

A still further object of the present invention is to provide a camera for making constant a period required for a cycle for detecting a defocus condition dependent on movement of the variator lens.

In order to attain the above described object, the camera having a zoom lens unit comprises: light receiving means for receiving light from an object; a first lens fixed in a position at a predetermined forward distance from a light receiving portion of the light receiving means; a second lens as the variator lens movable between the first lenas and the light receiving portion; first drive means for moving the second lens; a third lens as the compensator lens movable between the second lens and the light receiving portion, the first, second and third lenses constituting the zoom lens unit, movement of the second lens by the first drive means changing a focal length of the zoom lens unit, and movement of the third lens adjusting a focusing of the zoom lens unit; change detecting means for detecting that the focal length of the zoom lens is being changed; focus detecting means including, light receiving means having an image pickup member of a charge accumulation type for receiving, in the image pickup member, at least part of light from the object to convert the receiving light into an electric signal, control means for controlling a charge accumulation period for receiving the light in the image pickup member within a range of a predetermined period detecting means for detecting a focusing condition of the third lens based on the electric signal accumulated within the charge accumulation period, and detection time regulating means for forbidding the start of a next light receiving operation by the light receiving means until a sum of an operation period required for detecting the focusing condition based on the electric signal and the charge accumulation period attains a predetermined time when the sum is less than the predetermined time; and second drive means for electrically driving the third lens based on an output of the focus detecting means.

The camera having the zoom lens unit and constructed as described above makes it possible to improve a focusing precision during zooming since defocus data is obtained for each cycle of the predetermined period and the compensator lens can be driven at an ideal speed renewed substantially for each cycle of the predetermined period.

A still further object of the present invention is to provide a camera for forbidding switching of focus detection areas dependent on movement of the variator lens.

In order to attain the above described object, the camera having a zoom lens unit comprises: a first lens as the variator lens driven to change a focal length of the zoom lens unit; a second lens as the compensator lens driven to adjust a focusing; an image pickup means having a first light receiving area and a second light receiving area for receiving light from an object passing through the first and second lenses; change detecting means for detecting that the focal length is being changed; focus detecting means including first detecting means for detecting a focusing condition based on the received light in the first light receiving area, second detecting means for detecting a focusing condition based on the received light in the second light receiving area, detection selecting means for selecting either the first detecting means or the second detecting means, switching means for switching from the selected one of the first and second detecting means to the other detecting means, and switching limiting means responsive to an output of the change detecting means for forbidding the switching by the switching means; and drive means responsive to an output of the focus detecting means for electrically driving the second lens.

In the camera having the zoom lens unit and constructed as described above, a period for focus detection can be shortened by a period required for selecting a focus detection area since the focus detection area is fixed during zooming, and accordingly a focusing precision can be improved.

A still further object of the present invention is to provide a camera for forbidding switching of displays of detection focus area dependent on movement of a variator lens.

In order to attain the above described object, the camera having a zoom lens unit comprises: a first lens as the variator lens driven to change a focal length of the zoom lens unit; a second lens as the compensator lens driven to adjust a focusing; an image pickup means having a first light receiving area and a second light receiving area for receiving light from an object passing through the first and second lenses; change detecting means for detecting that the focal length is being changed; focus detecting means including first detecting means for detecting a focusing condition based on the received light in the first light receiving area, second detecting means for detecting a focusing condition based on the received light in the second light receiving area, detection selecting means for selecting either the first detecting means or the second detecting means, and switching means for switching to the second or first detecting means when detection by the first or second detecting means selected is incapable; display means for displaying the first or second light receiving area corresponding to the first or second detecting means selected by the detection selecting means; display control means responsive to an output of the change detecting means for maintaining the display of the first or second light receiving area in the display means, irrespective of switching by the switching means; and drive means responsive to an output of the focus detecting means for electrically driving the second lens.

The camera having the zoom lens unit and constructed as described above makes it possible to prevent difficulty in observing an image in a finder during zooming since the indication of the focus detection area displayed in the view finder is fixed and unchanged during zooming.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B show flow charts of entire processing in the first embodiment of the present invention.

DESCRIPTION OF THE PREFERRED EMBODIMENTS

In the following, embodiments of the present invention will be described.

Figure 2:
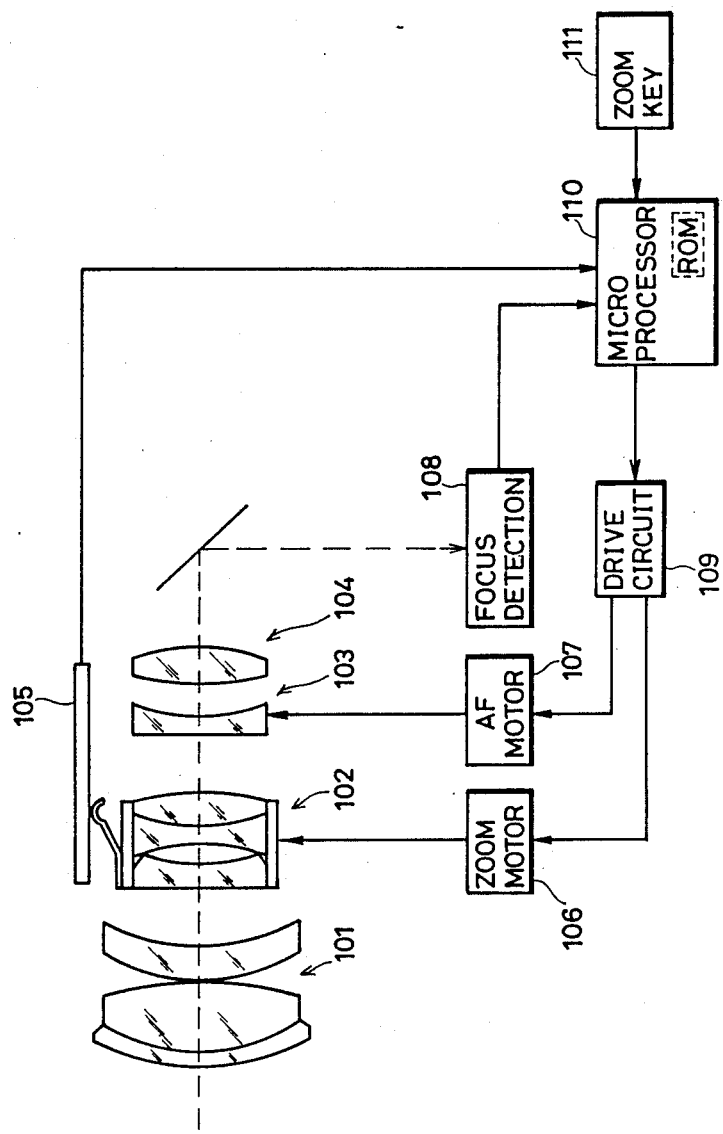
FIG. 2 is an illustration showing a main construction of an automatic focusing apparatus of a first embodiment of the present invention.

First Embodiment:

FIG. 2 is a diagram showing a main construction of an automatic focusing apparatus according to the first embodiment of the present invention. A zoom lens unit comprises lenses 101 to 104, including a variator lens 102 (hereinafter referred to as a variator) movable for varying the focal length of the zoom lens unit and a compensator lens 103 (hereinafter referred to as a compensator) for focus adjustment, especially for compensating a deviation of a focal point of the zoom lens unit caused by a movement of the variator 102. A zoom encoder 105 for reading a position of the variator 102 is provided over the variator 102. The whole moving range of the variator 102 is divided into five focal length zones and the zoom encoder 105 detects the zone where the variator 102 is located. A zoom motor 106 for driving the variator 102 and an auto focus (AF) motor 107 for driving the compensator 103 are connected to a drive circuit 109. A focus detecting portion 108 detects a focus condition of light from an object, passing through the lenses 101 to 104. The zoom motor 106 and the AF motor 107 are driven through the drive circuit 109 in response to a signal from a microprocessor 110 which receives signals from the focus detecting portion 108, the zoom encoder 105 and a zoom key 111 operated for zooming as well as directing the direction of the zooming.

Now, a construction of the focus detecting portion 108 will be described.

Figure 3:
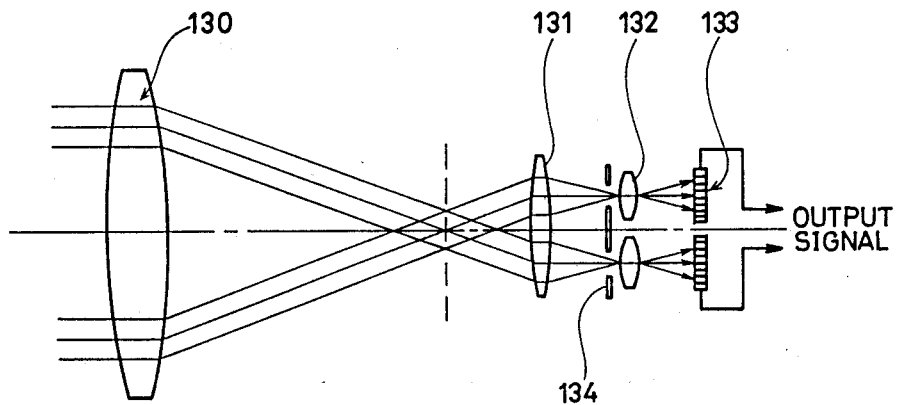
FIG. 3 is a diagram showing a construction of a focus detecting portion as an example of the present invention, including an optical system.
Figure 4:
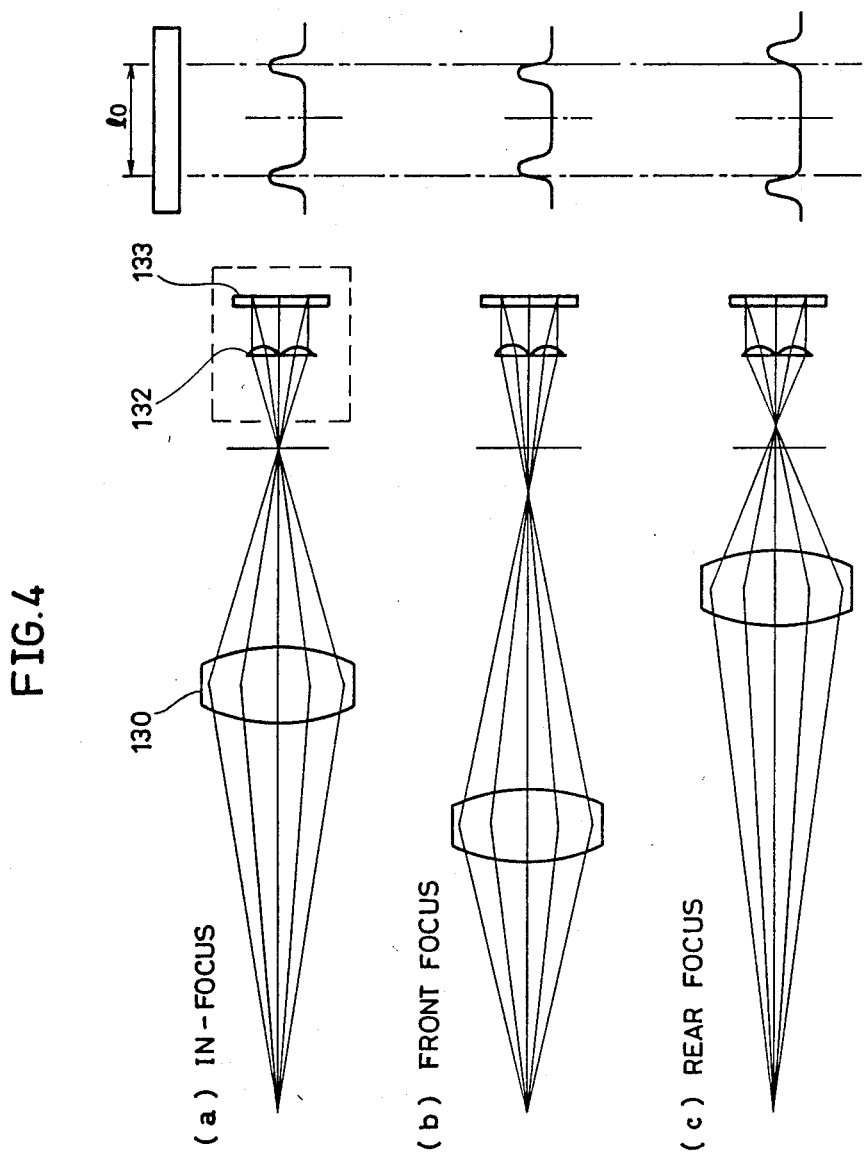
FIG. 4 is an illustration showing a principle of focus detection as an example of the present invention, where various focus conditions are represented.

FIG. 3 shows the construction of the focus detecting portion 108 including an optical system. FIG. 4 is an illustration for explaining focus conditions. Referring to FIGS. 3 and 4, the incident light passing through a lens 130 is divided into two beams by means of an aperture mask 134 through a relay lens 131 and those beams are reimaged on two regions, i.e., a basic region and a reference region set on a charge coupled device (CCD) line sensor 133, by means of a reimaging lens 132. As shown in FIG. 4, assuming that a distance between two images reimaged on the CCD line sensor 133 is l0 in an in-focus condition, the distance of the two images in a front focus condition is smaller than l0 and that in a rear focus condition is larger than l0. This distance of the images is substantially proportional to a defocus amount. Accordingly, if the distance of the images is detected, an in-focus condition or an out-of-focus condition can be determined and in the case of the out-of-focus condition, a defocus amount and a direction of defocus can be determined. Therefore, in order to perform a focusing operation when zooming is not effected, the microprocessor 110 calculates the defocus amount based on information from the focus detecting portion 108 and the AF motor 107 is driven to move the compensator 103 by a distance corresponding to that amount (see FIG. 2).

A method for maintaining an in-focus condition during zooming will be described in the following.

Figure 5:
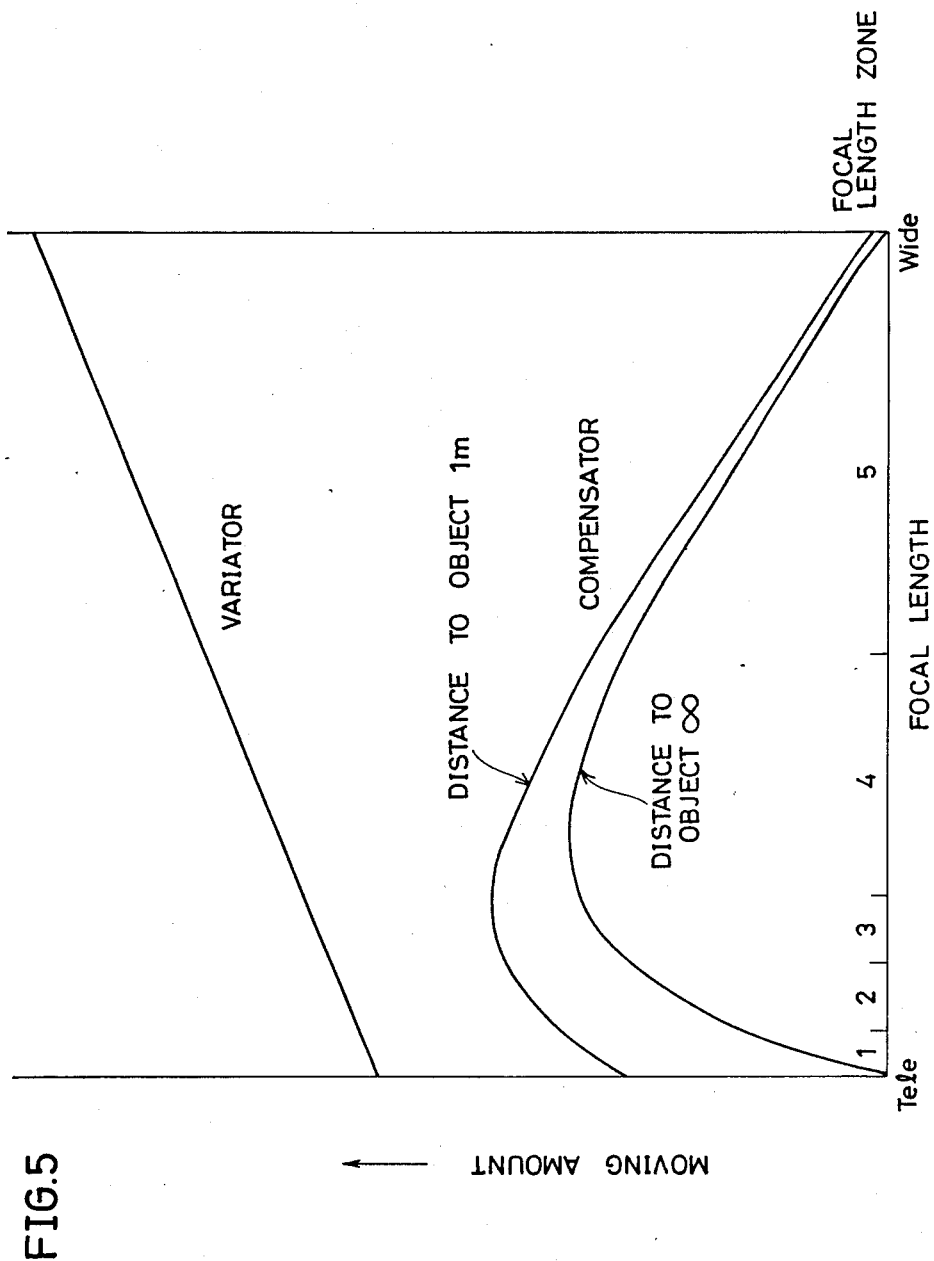
FIG. 5 shows a relation between a moving amount of a variator lens and that of a compensator lens in the first embodiment of the present invention.

FIG. 5 shows a relation between a moving amount of the variator 102 with respect to a focal length and a moving amount of the compensator 103 for maintaining constant a position of an image pickup face or a focal point. As for a distance to an object, this diagram of FIG. 5 shows only two cases, i.e., a distance of 1 m and an infinite distance. Thus, if the compensator 103 can be driven to move corresponding to the curves in the diagram, the in-focus condition can be maintained during zooming.

Figure 6:
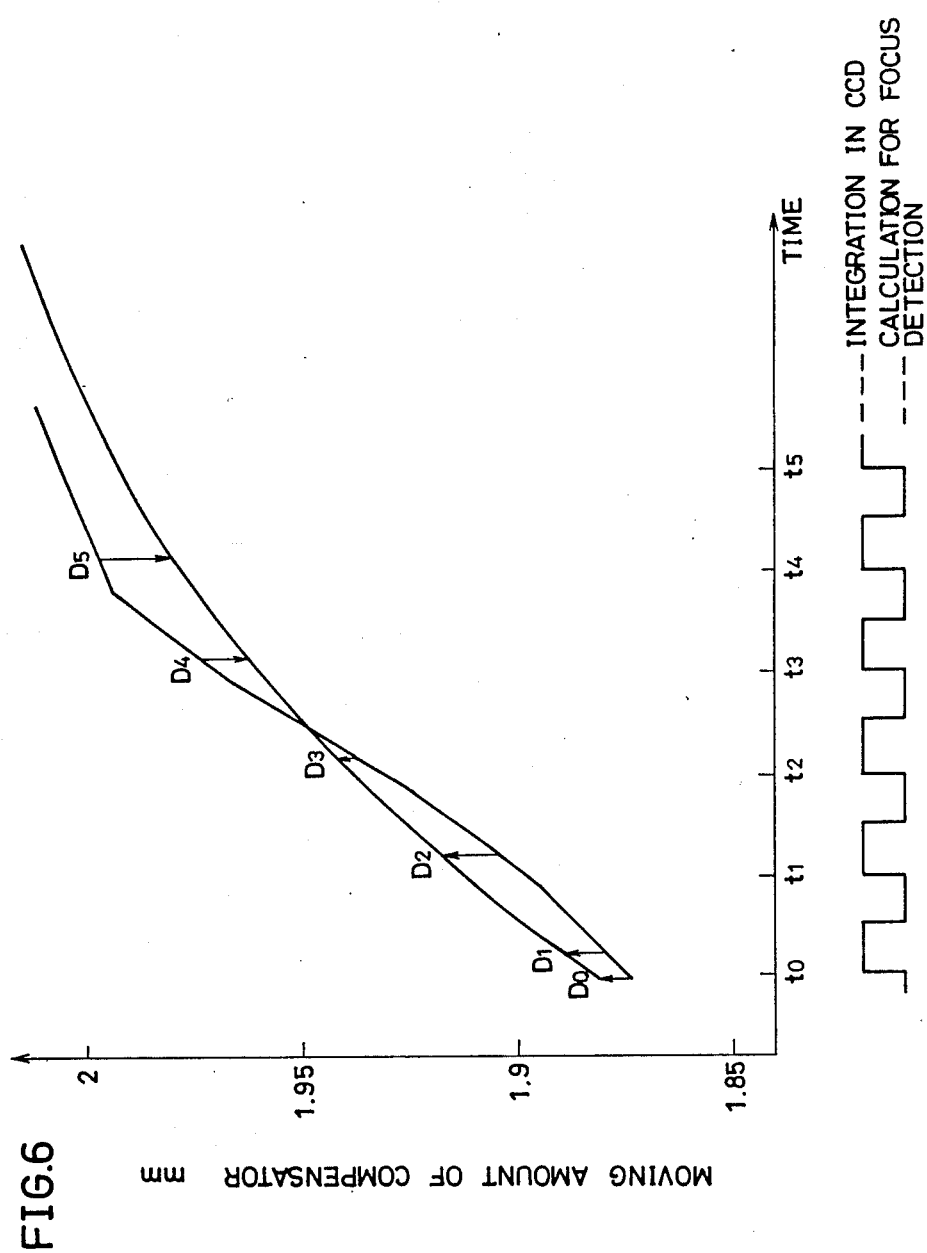
FIG. 6 shows a change of an actual moving amount of the compensator lens in relation to time compared with an ideal follow-up curve in the first embodiment of the present invention.

In FIG. 6, a curve represents an ideal movement of the compensator 103 for maintaining the in-focus condition during zooming, while broken lines represent an example of a real movement of the compensator 103. If the broken lines are within a range near the above mentioned curve, a practical in-focus condition can be maintained. Information necessary for driving the compensator 103 during zooming includes a focal length, a zooming direction, a result of focus detection (i.e., a defocus amount) and the like.

The focus detecting portion 108 accumulates charge in the CCD line sensor 133 dependent on an amount of received light (that is, integration in CCDs is performed) and the microprocessor 110 performs calculation for focus detection based on the result of the integration. Consequently, a little time is required after the zoom key 111 is turned on (at the time t=t0 in FIG. 6) until a result of focus detection is first obtained (at the time t=t1 in FIG. 6). If only the variator 102 is driven and the compensator 103 is stopped during this period, a considerably defocused image is obtained. Therefore, when the zoom key 111 is turned on (at the time t=t0 in FIG. 6), the variator 103 and the compensator 102 start to be driven simultaneously. The moving speed of the compensator 103 at this time is a basic speed (predetermined for each focal length zone and each zooming direction) read from a ROM of the microprocessor 110 based on information from the zoom encoder 105 (i.e., a focal length zone where the variator 102 is located) and information from the zoom key 111 (i.e., a zooming direction). For example, if the variator 102 exists in the third zone (as shown in FIG. 5) during zooming in the wide direction (as defined above), a basic speed for the third zone in the wide direction (i.e., +0.18 mm/sec) is read out from the ROM in the microprocessor 110 so as to be used as the moving speed of the compensator 103. If the variator 102 exists in the fifth zone, a basic speed for the fifth zone in the wide direction (i.e., −0.25 mm/sec) is read out from the ROM so as to be used as the moving speed of the compensator 103. The + sign for indication of the speed means a forward movement of the compensator 103.

Basic speed values are set in the following manner. It is assumed that zooming is made in a direction with respect to an object located at a distance corresponding to an intermediate value between a moving amount of the compensator 103 in an in-focus condition to a minimum photographing distance and that to an infinite photographing distance. On that assumption, an ideal speed of the compensator 103 for maintaining an ideal in-focus condition is considered and an average value of the ideal speed in each of the focal length zones is selected as a basic speed of the compensator 103 for each focal length zone in each zooming direction. Thus, two basic speeds, i.e., for zooming in the wide direction and for zooming in the tele direction (as defined above) are set for each focal length zone.

The + or − sign of the basic speeds of the compensator 103 (in the moving direction of the compensator 103) and absolute values thereof are changed according to the zooming directions dependent on the focal length zones. For example, in the first zone, zooming is not made further in the tele direction beyond the tele end (as defined above) and accordingly the basic speed for zooming in the tele direction for the first zone is set to a value approximate to an ideal speed near the wide end (as defined above) in the first zone and it has an absolute value different from that of the basic speed for zooming in the wide direction.

As can be seen from FIG. 5, a curve of the moving amount of the compensator 103 differs dependent on the distance to an object and, consequently, if the compensator 103 continues to be moved only at the basic speed, deviation from the in-focus condition may occur. Therefore, when a result of focus detection is obtained after a start of zooming, the moving speed of the compensator 103 is controlled based on the zooming direction, the focal length zone and the result of focus detection (i.e., a defocus amount), so that the in-focus condition can be maintained. As the compensator 103 continues to be driven during integration in the CCDs and calculation for focus detection and the result of focus detection is obtained based on the charge accumulated during integration, a defocus amount $D_i$ obtained at the time $t=t_i$ indicates a defocus amount at a moment preceding the time $t=t_i$ by a period required for the integration and the calculation for focus detection, namely at a moment corresponding to a central point of the period of the integration. Since the variator 102 is continuously moved, an in-focus condition cannot be obtained if the compensator 103 is only moved by the defocus amount $D_i$ from the position at the time $t=t_i$. In this embodiment, the moving speed of the compensator 103 is controlled by using the defocus amount $D_i$ obtained at the time $t=t_i$ and a defocus amount $D_{i-1}$ obtained at the previous detection time $t=t_{i-1}$ as the result of focus detection, whereby the in-focus condition during zooming can be maintained.

The control of the speed of the compensator 103 will be described by taking an example of zooming in the wide direction in the third zone. The curve in FIG. 6 represents a change according to the time in a moving amount of the compensator 103 in a case in which light from an object at a distance of 2 m continues to be focused on an image pickup face during zooming. The broken lines in FIG. 6 represent changes according to the time concerning the moving amount of the compensator 103, the speed of which is controlled.

If the zoom key (for selection of the wide direction) is pressed at the time $t=t_0$, the variator 102 starts to be moved in the wide direction and simultaneously the compensator 103 starts to be moved at the basic speed (0.18 mm/sec) in the wide zooming direction in the third zone. In addition, the CCD line sensor 33 starts to store charge, thereby to perform integration in the CCDs. The integration is completed after a lapse of a period dependent on luminance of the object and calculation for focus detection is performed based on the data. When the result of focus detection (i.e., a defocus amount $D_1$) is obtained at the time $t=t_1$, the moving speed of the compensator 103 is changed based on the defocus amount $D_1$ and a defocus amount $D_0$ obtained immediately before the start of zooming and the compensator 103 is moved at the changed speed until the subsequent result of focus detection is obtained at the time t=t2. When a defocus amount D2 is obtained as the result of focus detection at the time t=t2, the moving speed of the compensator 103 is changed based on the defocus amount D2 and the defocus amount D1 obtained at the time t=t1. Subsequently, the same procedures are executed.

Since the above mentioned defocus amount Di (i=0, 1, 2, etc.) is an amount converted as a moving amount of the compensator, the in-focus condition can be correctly obtained if the compensator 103 is moved by the amount Di in a state in which the variator 102 is stopped. It should be noted, if the amount Di is within a range of ±35 μm, the in-focus condition can be practically regarded as being obtained and the compensator 103 is not moved actually. In the case of FIG. 6, since the defocus amount D0 immediately before the start of zooming is +7 μm, zooming is started in the in-focus condition and the in-focus condition is maintained during the zooming.

The moving speed of the compensator 103 is set in the following manner. First, a data table as shown in Table 1 is selected from the ROM of the microprocessor 110 based on the zooming direction and the focal length zone. Then, a suitable value is read out from the table based on the newest defocus amount Di and a difference between the defocus amount Di and the defocus amount Di−1 obtained at the immediately preceding cycle of focus detection (i.e., Di−Di−1), whereby the moving speed of the compensator 103 is set. For example, the moving speed of the compensator 103 between the time t=t2 and the time t=t3 is selected based on the amount D2 and the difference (D2−D1). More specifically, since D1=+9 μm and D2= +13 μm, the moving speed of the compensator 103 is set to +0.25 mm/sec.

Data on the moving speed of the compensator 103 in the tele zooming direction in the third zone is shown in Table 2. With the same conditions as described above (namely, D1=+9 μm and D2=+13 μm), the moving speed of the compensator 103 is set to −0.13 mm/sec. Although Table 1 and Table 2 are shown with regard to the third zone, the moving speeds in the other zones are also determined appropriately based on the zooming direction, the present defocus amount and a difference between the present defocus amount and the previous defocus amount, and those data are also stored in the ROM of the microprocessor 110.

TABLE 1

| | Moving Speed of Compensator [mm/sec] (3rd zone, wide direction) | | | | | | | |
|---|---|---|---|---|---|---|---|---|
| | Di - Di-1 (μm) | | | | | | | |
| Di (μm) | ~−33 | −33~−22 | −22~−11 | −11~0 | 0~11 | 11~22 | 22~33 | 33~ |
| 22~ | 0.25 | 0.25 | 0.33 | 0.33 | 0.42 | 0.5 | 0.58 | 0.58 |
| 11~22 | 0.17 | 0.17 | 0.25 | 0.25 | 0.33 | 0.42 | 0.5 | 0.5 |
| 0~11 | 0.08 | 0.08 | 0.25 | 0.25 | 0.25 | 0.25 | 0.33 | 0.33 |
| −11~0 | 0.08 | 0.08 | 0.17 | 0.17 | 0.17 | 0.17 | 0.25 | 0.25 |
| −22~−11 | 0.08 | 0.08 | 0.08 | 0.17 | 0.17 | 0.17 | 0.17 | 0.17 |
| −33~−22 | 0 | 0 | 0.08 | 0.08 | 0.08 | 0.08 | 0.08 | 0.08 |
| ~−33 | 0 | 0 | 0 | 0 | 0 | 0.08 | 0.08 | 0.08 |

TABLE 2

| | Moving Speed of Compensator [mm/sec] (3rd zone, tele direction) | | | | | | | |
|---|---|---|---|---|---|---|---|---|
| | Di - Di-1 (μm) | | | | | | | |
| Di (μm) | ~−33 | −33~−22 | −22~−11 | −11~0 | 0~11 | 11~22 | 22~33 | 33~ |
| 22~ | −0.08 | −0.08 | −0.08 | −0.08 | −0.08 | −0.08 | −0.08 | −0.08 |
| 11~22 | −0.17 | −0.17 | −0.13 | −0.13 | −0.13 | −0.08 | −0.08 | −0.08 |
| 0~11 | −0.25 | −0.25 | −0.17 | −0.13 | −0.13 | −0.13 | −0.08 | −0.08 |
| −11~0 | −0.33 | −0.33 | −0.25 | −0.25 | −0.25 | −0.25 | −0.08 | −0.08 |
| −22~−11 | −0.5 | −0.5 | −0.42 | −0.42 | −0.25 | −0.25 | −0.25 | −0.17 |
| ~−22 | −0.58 | −0.58 | −0.5 | −0.42 | −0.33 | −0.33 | −0.25 | −0.25 |

The values of the above indicated Tables will be explained in the following. As shown in FIG. 6, the ideal curve on the moving amount of the compensator 103 in the third zone in the wide zooming direction has a form rising to the right side. As for the broken lines representing a real moving amount of the compensator 103, the line is nearly parallel to the curve if (Di−−Di−1)=0. The line has an inclination smaller than the curve if (Di−Di−1)>0, and the line has an inclination larger than the curve if (Di−Di−1)<0. Accordingly, in the case of the same Di on the data tables, the moving speed of the compensator 103 increases as the difference (Di−Di−1) becomes large (toward the right side in Table 1 for example). In the case of Di>0, it is indicated that the real moving amount of the compensator 103 is smaller than the ideal moving amount thereof. In the case of Di<0, it is indicated that the real moving amount of the compensator 103 is larger than the ideal moving amount thereof. Therefore, if the value of (Di−Di−1) is the same in each data table, the moving speed of the compensator increases as the value Di becomes large (toward the upper side in Table 1 for example).

As described above, the inclination of each of the broken lines can be determined to be larger or smaller than that of the curve based on the value of (Di−−Di−1). If each time interval for focus detection becomes shorter with the value of (Di−Di−1) being unchanged, a difference between the inclinations is increased. On the other hand, if each time interval for focus detection becomes longer with the same value of (Di−Di−1), a difference between the inclinations is decreased. Consequently, the moving speed of the compensator 103 can be controlled easily if the time intervals for focus detection are constant. The time required for accumulating a charge in the CCD line sensor 133 enough calculation for focus detection becomes long as the luminance of the object is lowered. Therefore, the time intervals for focus detection during zooming are made constant in the following manner.

(i) The integration in the CCDs is brought to an end in the lapse of 50 msec during zooming even if the luminance of the object is not sufficiently high.

(ii) If the integration in the CCDs is completed within 50 msec because of a high luminance of the object, a waiting time is provided corresponding to a period by which the integration period is shorter than 50 msec.

Since the time required for calculation for focus detection based on the result of the integration is about 50 msec including a data transfer time and the like, a cycle for focus detection becomes a constant value of about 100 msec in the above described manner.

Since an angle of view is changed by zooming, light from the object to the light receiving device also changes. In addition, if the lines in the above mentioned graph are not almost parallel to the curve, the defocus amount is also continuously changed. As a result, a precision of focus detection during zooming is lower than that of focus detection without zooming operation. This tendency becomes more intense as a period for integration in the CCDs becomes longer. In other words, the present embodiment has advantages that decrease in the precision of focus detection due to the above described factors which can be prevented if the period for integration in the CCDs during zooming is limited to a short time and that a follow-up or tracking characteristic with respect to the object can be improved.

Although it may happen that focus detection is incapable because the integration in the CCDs is stopped in the lapse of 50 msec in spite of a low luminance of the object, the compensator 103 is driven in such a case at the basic speed so that the image may not considerably deviate from the in-focus condition. If focus detection is incapable because of a low contrast of the object, the compensator 103 is also driven at the basic speed.

Referring to flow charts of FIGS. 7A and 7B, operation of the apparatus as a whole will be described. First, in the step S0, integration in the CCDs and calculation for focus detection based on an output provided as the result are performed. Subsequently, in the step S1, a state of the zoom key 111 is read and a position of the variator 102 is read by the zoom encoder 105. In the step S2, it is determined whether the zoom key 111 is pressed or not.

If it is determined in the step S2 that the zoom key 111 is not pressed, the variator 102 and the compensator 103 are not driven (in the step S12) and focus detection is performed (in the step S18). Then, the compensator 103 is driven to be moved by a defocus amount obtained as a result of the focus detection (in the step S19) so as to obtain an in-focus condition and, after that, the processing flow returns to the step S0. Thus, processing in a case without zooming is performed.

If it is determined in the step S2 that the zoom key 111 is pressed, the processing flow proceed to the step S3. If the zoom key 111 is pressed in the first cycle, the flow proceeds to the step S4 to set a basic speed read out from the ROM based on the focal length zone where the variator 102 exists and the zooming direction. Then, in the step S5, the variator 102 starts to be driven at a predetermined speed and at the same time, the compensator 103 starts to be driven at the basic speed set in the step S4. The flow proceeds to the step S13 to determine whether focus detection is capable or not based on the result of the calculation for focus detection performed in the step S0. If focus detection is capable, a focus condition is detected in the step S15. Then, a speed read out from the data table on the ROM based on the focal length zone, the zooming direction and the defocus amount is set in the step S16. If focus detection is incapable because of a low contrast of the object and the like, a basic speed is set in the step S14. Then, the flow proceeds to the step S17, where the compensator 103 is driven at the speed set in the step S16 or S14, and then the flow returns to the step S0. In the step S1, the states of the zoom key 111 and the zoom encoder 105 are determined. If the zoom key is turned on (in the step S2), which means that it is pressed in the second cycle, the flow proceeds from the step S3 to the step S6. If the zooming direction is the same as in the previous cycle and the focal length zone where the variator 102 exists is also the same as in the previous cycle (in the step S7), the flow proceeds to the step S13. If the zooming direction is determined to be opposite to that in the previous cycle in the step S6, the flow proceeds to the step S10, where a basic speed corresponding to the focal length zone and the zooming direction is read out from the ROM and set. Then, in the step S11, the variator 102 is driven in a direction opposite to that in the previous cycle and the compensator 103 is driven at the basic speed set in the step S10. Then, the flow proceeds to the step S13. If it is determined in the step S6 that the zooming direction is the same as in the previous cycle and it is determined in the step S7 that the focal length zone is different from that in the previous cycle, the flow proceeds to the step S8, where a basic speed corresponding to the focal length zone in this cycle is read out from the ROM and set. Then, in the step S9, the compensator 103 is driven at the speed set in the step S8. Subsequently, the flow proceeds to the step S13. Processing beginning with the step S13 is performed in the same manner as described above in connection with the previous cycle.

Figure 8A:
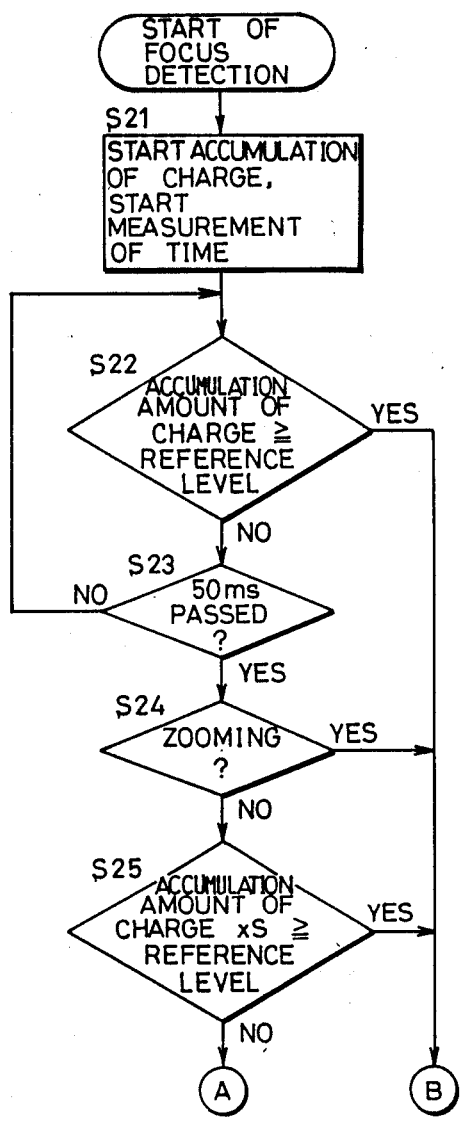
FIGS. 8A and 8B show flow charts concerning regulation of time for focus detection in the step S0 of FIG. 7.
Figure 8B:
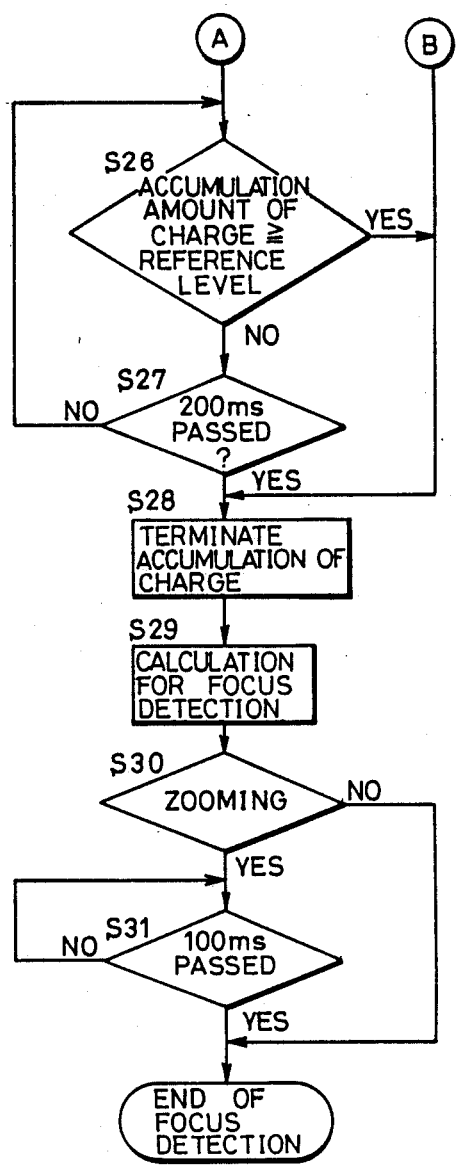

Referring now to the flow charts of FIGS. 8A and 8B, regulation of time for focus detection in the step S0 shown in FIGS. 7A and 7B will be described. In the step S21, accumulation of charge in the CCD line sensor 133 is started and measurement of time for focus detection is started. If luminance of the object is so high that an accumulation amount of charge exceeds a reference level within 50 msec (in the steps S22 and S23), accumulation of charge is terminated at the moment that the amount exceeds the reference level (in the step S28).

Figure 9:
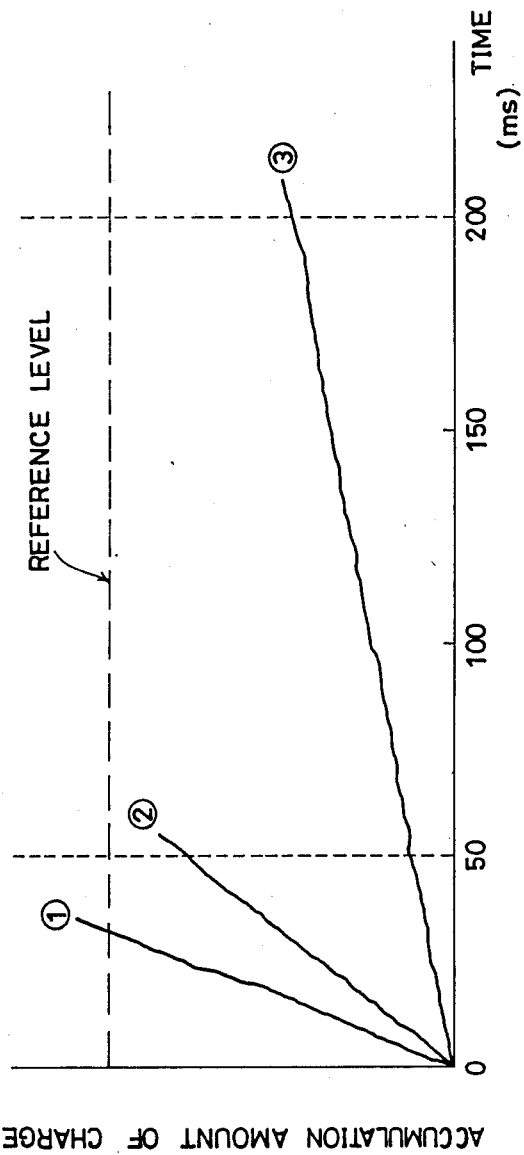
FIG. 9 shows changes of a storage amount of charge in relation to time in the first embodiment of the present invention.

FIG. 9 is a graph showing changes in an accumulation amount of charge with a lapse of time, curves as ①, ② and ③ being obtained according to decrease of luminance of an object. The curve ① corresponds to an example in which accumulation of charge is terminated within 50 msec as described above.

If an accumulation amount of charge does not exceed the reference level after a lapse of 50 msec, the flow proceeds to the step S24 and if zooming is being effected, the accumulation of charge is terminated irrespective of the accumulation amount of charge (in the step S28). If zooming is not being effected, the flow proceeds to the step S25 and if a value obtained by multiplying the accumulation amount of charge by a predetermined value "s" exceeds the reference level, that is, if information sufficient for performing calculation for focus detection is obtained by amplifying an output of the CCD line sensor 133 in an amplifier circuit (not shown), the accumulation of charge is terminated.

The curve ② in FIG. 9 represents the above described case.

If the accumulation amount of charge does not attain the reference level even after the amplification, the flow proceeds to the step S26, so that the accumulation of charge continues until 200 msec have passed (in the step S27). The curve ③ in FIG. 9 corresponds to this case. However, if it is determined in the step S26 that the accumulation amount of charge exceeds the reference level before the lapse of 200 msec, the accumulation of charge is terminated at that moment.

When the accumulation of charge is terminated (in the step S28), the flow proceeds to the step S29 to perform calculation for focus detection. After a result of the focus detection is obtained and if zooming is being effected, there is a waiting time. When 100 msec passes after a start of measurement of time in the step S21, one cycle of focus detection is completed (in the steps S30 and S31). If zooming is not being effected, it is immediately determined that one cycle of focus detection is completed. Thus, the time for one cycle of focus detection during zooming can be made constant (100 msec in the above described example).

Second Embodiment:

The second embodiment of the present invention will be described in the following.

Figure 10:
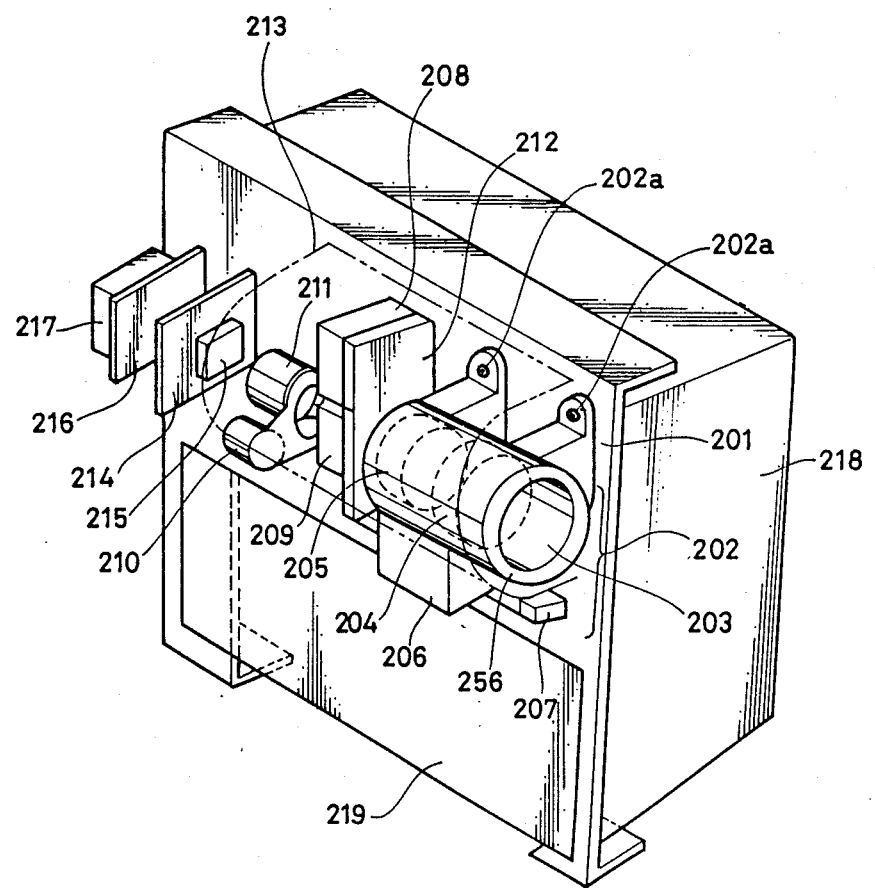
FIG. 10 is a schematic perspective view showing an internal structure of a VTR-incorporated video camera according to a second embodiment of the present invention.

FIG. 10 is a perspective view showing an interval structure of a video tape recorder (VTR)-incorporated video camera. As shown in FIG. 10, a lens block 202 is fixed to a frame 201 by means of screws 202a. This lens block 202 comprises: a front lens 203; a variator 204; a compensator 205; a drive unit 206 including a zoom motor and an auto focus (AF) motor for driving the variator 204 and the compensator 205 respectively in optical axis directions thereof, the drive unit further including an encoder for detecting a position of the variator 204; a light receiving portion 207 for white balance adjustment; a focus detection module 208 for automatic focusing; a half prism 209; an aperture control meter 210; a master lens 211; a lens support plate 212 for coupling those elements; a flexible lens base plate 213 for controlling the drive unit 206, the WB light receiving portion 207, the focus detection module 208 and the aperture control meter 210, and other components. The front lens 203, the variator 204 and the compensator 205 constitute a zoom lens unit. The front lens 203, the variator 204 and the compensator 205 are contained in a single fixed cylinder 256 as described afterwards. A zooming ring, a distance adjustment ring and the like as in a conventional apparatus are not provided. Accordingly, the zoom lens unit has a very simple structure of a small size and the whole lens block 202 can be easily incorporated in a main body of the camera.

A CCD 215 soldered to a CCD plate 214 is provided on a back side of the lens block 202 through a member not shown. An electronic view finder (EVF) 217 formed by a flat fluorescent display tube soldered to an electronic view finder plate 216 is fixed to a frame 201 on a back side of the CCD 215. Further, a video tape recorder (VTR) deck 218 and a video plate 219 for processing a signal from the CCD 215 and controlling driving of a camera are fixed to the frame 201.

Figure 11:
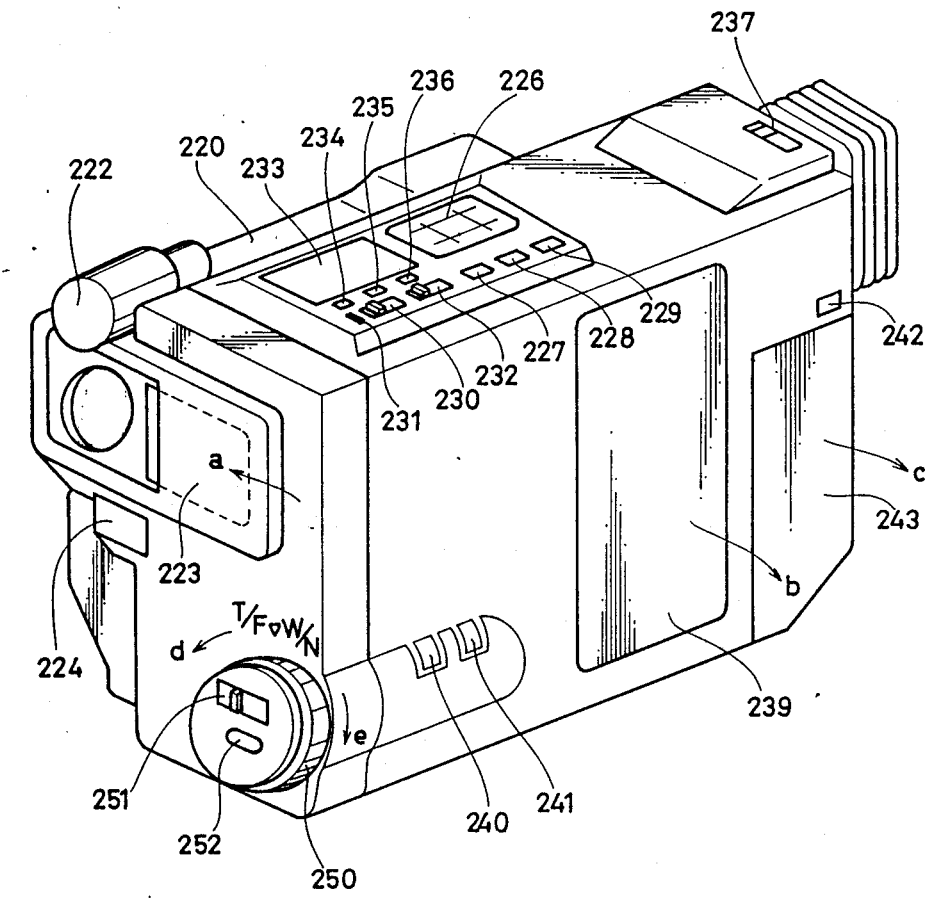
FIG. 11 is an external perspective view taken from a front side of the VTR-incorporated video camera of the second embodiment of the present invention.
Figure 12:
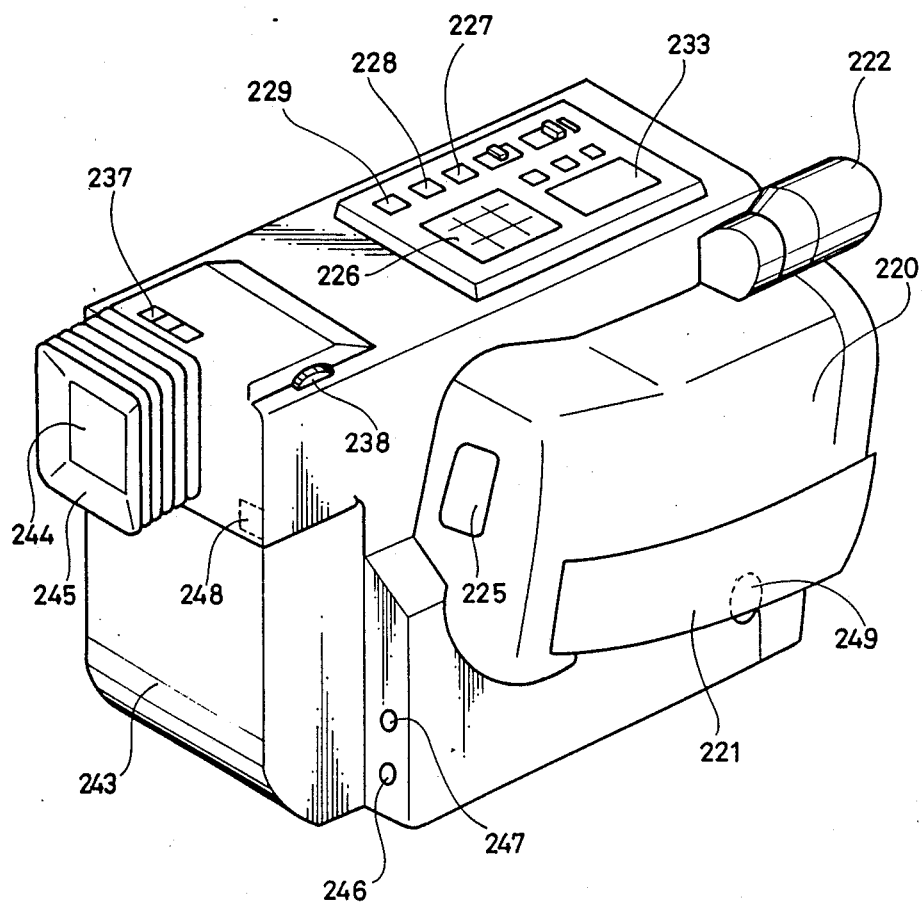
FIG. 12 is an external perspective view taken from a back side of the VTR-incorporated video camera of the second embodiment of the present invention.

FIGS. 11 and 12 are external perspective views of the above described VTR-incorporated video camera. A grip 220 for containing the above described lens block 202 is provided on the right side of the camera as viewed from the back of the camera. A hand strap 221 is attached to the grip 220. A microphone 222 is provided removably in an upper front portion of the grip 220. A slider 223 to be moved in the direction of the arrow "a" for protection of the lens is provided on the front face of the camera. A light receiving window 224 formed by a white diffusion plate is provided in front of the light receiving portion 207 for white balance adjustment. A trigger button 225 is provided in a back portion of the grip 220.

An upper surface of the camera has a panel comprising: a control switch 226 for controlling operations of nine modes, i.e., PLAY, FF (fast forwarding), REW (rewinding), STOP, PAUSE, REC (recording), EJECT (ejection of a cassette), MONITOR (monitoring of an image) and REC-REVIEW (checking of recording); an automatic exposure lock switch 227 for temporarily locking the light measurement for the exposure control; a white balance lock switch 228 for locking white balance; a date switch 229 for imprinting a date on an image to be recorded; a power switch 230; a light emitting diode 231 which is illuminated when the power switch 230 is turned on; an EP/SP switch 232 for switching between a long-period recording mode and a standard-period recording mode; a liquid crystal display 233 for displaying an operation mode of the deck, a count value of the counter or a date; a mode switch 234 for switching between the display of the count value and the display of the date; and setting switches 235 and 236 for setting the date, resetting the counter and functioning as a memory switch.

A back portion of the upper surface of the camera has a diopter adjusting dial 237 for adjusting a diopter of an operator, and a tracking adjusting dial 238 for tracking adjustment in the PLAY mode. A left side face of the camera includes: a cassette lid 239 which moves in the direction of the arrow "b" by operation of the EJECT switch to serve as an inlet and an outlet of a cassette; a fade switch 240 to be turned on for fade-out and to be turned off for fade-in; a finder magnification switch 241 for magnifying an image of the electronic view finder 217; and a lock button 242 for removing a battery case 243 in the direction of the arrow "c". A back face of the camera includes an eyepiece 244, an eyepiece hood 245, an earphone terminal 246 for monitoring input and output of sound, a remote control terminal 247 for turn-on and turn-off for moving and stopping a tape, a DC input terminal 248, and an AV terminal 249 for input and output of a video signal and a sound signal.

Figure 13:
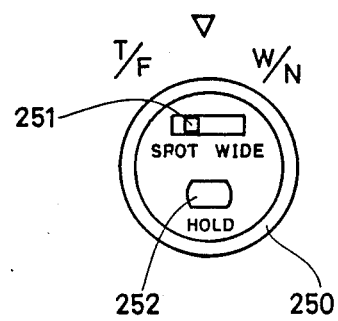
FIG. 13 is a front view of a zoom switch operation portion shown in FIG. 11.
Figure 14:
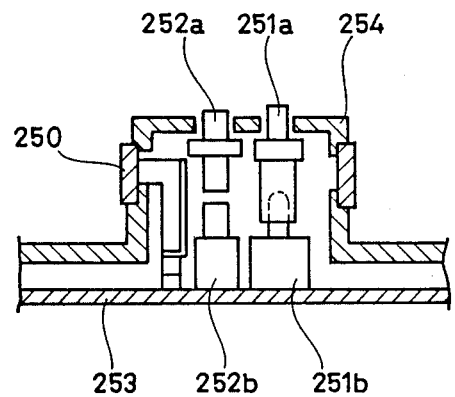
FIG. 14 is a vertical sectional view of the zoom switch operation portion shown in FIG. 13.

An operation portion for driving the zoom lens unit of this embodiment is provided in a lower front portion of the camera shown in FIG. 11. As shown in FIG. 13, this operation portion comprises: a ring-shaped zoom/-focus ring 250 for operating a zoom switch; an AF mode switch 251 for switching between a spot area and a wide area for automatic focusing, this switch 251 being provided inside the zoom-focus ring 250; and a hold button 252a for switching the AF mode, this button 252a being provided below the AF mode switch 251 inside the zoom/focus ring 250. FIG. 14 shows a sectional view of the above described operation portion. The AF mode switch 251 comprises an AF mode lug 251a projecting from a front plate 254, and a slide switch 251b fixed to a base plate 253 to be engaged with the AF mode lug 251a, the slide switch 251b being moved together with the AF mode lug 251a. The hold button 252a and a push-on/push-off switch 252b fixed to the base plate 253 to be in contact with a lower end of the button 252a constitute a hold switch 252 for switching between an auto focus mode and a manual focus mode. When the hold switch 252 is turned off, the auto focus mode is selected. When the hold switch 252 is turned on, the manual focus mode is selected. The zoom/focus ring 250 functions as a zoom switch in the auto focus mode. It has a two-stage switching structure. At the first stage, zooming is effected on a long-focus side (that is, in the tele direction) when it is rotated in the direction of the arrow "d" in FIG. 11 and on a short-focus side (that is, in the wide direction) when it is rotated in the direction of the arrow "e". At the second stage, high-speed zooming is attained when it is further rotated in the tele direction or in the wide direction. When the manual focus mode is selected, the zoom/focus ring 250 functions as a focus switch, which can focus on an object at a far distance or a near distance when it is rotated in the direction of the arrow "d" or the direction of the arrow "e".

Figure 15:
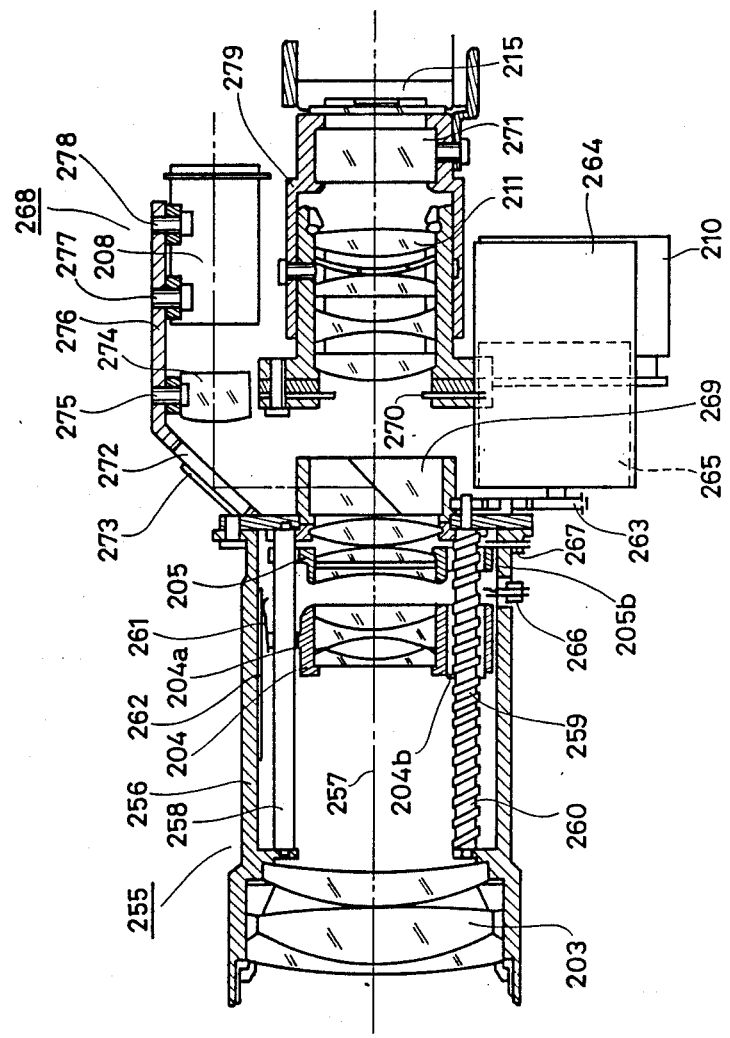
FIG. 15 is a sectional view particularly showing a structure of an optical system of the VTR-incorporated video camera in the second embodiment of the present invention.

FIG. 15 shows in detail a structure of the optical system in the above described construction. A zoom lens unit 255 shown in FIG. 15 comprises, in a fixed cylinder 256, the forward lens 203, the variator 204 and the compensator 205 in order from the front side to the back side. The front lens 203 is fixed, while the variator 204 and the compensator 205 are movable as described afterwards. The variator 204 comprises a variable-magnification lens group, which is moved to change a focal length. The compensator 205 comprises a focus lens group, which functions to compensate for a change of the focusing position caused by the movement of the variator 204. The compensator 205 is driven by drive means independent of that for the variator 204. The fixed cylinder 256 contains a guide bar 258 parallel to an optical axis 257, as well as first and second lead screws 259 and 260. The guide bar 258 is located close to an inner surface of the fixed cylinder 256 along a longitudinal direction thereof and both ends of the guide bar 258 are fixed. Although the first and second lead screws 259 and 260 are represented as being provided on the same line, those lead screws are located at different positions parallel to each other on the same level and they are rotated by motors 264 and 265 described afterwards, respectively.

Figure 16:
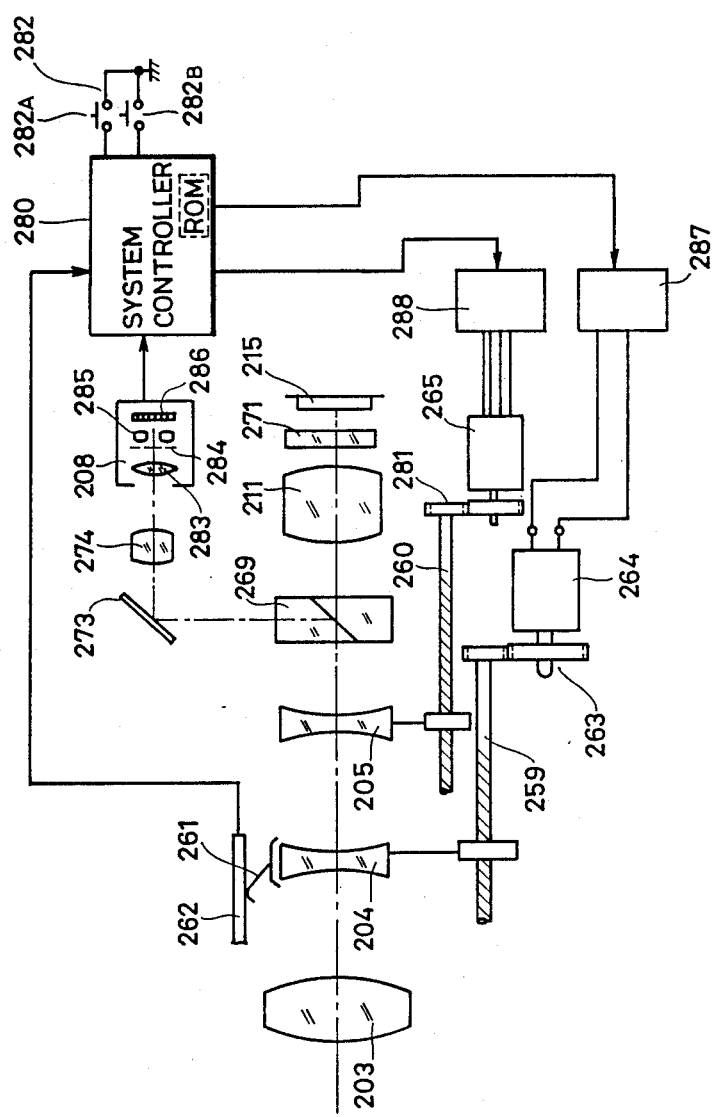
FIG. 16 is a diagram schematically showing calculation processing in a main body of the camera and control processing for moving a variator lens and a compensator lens in the second embodiment of the present invention.

The variator 204 has a concave groove 204a, through which it is slidably engaged with the guide bar 258. Thus, it can be moved along the direction of the optical axis 257 (i.e., the horizontal direction in the figure) while it is guided by the guide bar 258. The variator 204 has an engaging portion 204b including a screw groove on the side opposite to the side where the concave groove is provided. Thus, the variator 204 is engaged with the first lead screw 259 through the portion 204b. In addition, a brush 261 is attached to the variator 204. The brush 261 moves on contact pieces of the zoom encoder 262 provided on the inner surface of fixed cylinder 256. A structure and a function of the zoom encoder 261 will be described in detail afterwards referring to FIG. 17A. The compensator 205 has also a concave groove, through which it is slidably engaged with the guide bar 258, and it has also an engaging portion 205b opposite to the groove so as to be engaged with the second lead screw 260. The first lead screw 259 for driving the variator 204 is coupled to a zoom motor 264 through a gear mechanism 263 so as to be rotated by rotation of the zoom motor 264. The second lead screw 260 for driving the compensator 205 is coupled to an AF motor 265 through a gear mechanism 281 (as shown in FIG. 16). The zoom lens unit 255 includes a forward limit switch 266 and a backward limit switch 267 for limiting a moving range of the compensator 205, as shown in FIG. 15. The main body 268 of the camera containing in the zoom lens unit 255 comprises a photographing optical system including a half prism 269, a diaphragm 270, a master lens group 211, a low-pass filter 271, the photographing CCD 215 and the aperture control meter 210. The main body 268 further comprises a focus detection optical system including a total reflection mirror 273 provided on a frame window 272, an imaging lens 274 and the focus detection module 208.

The imaging lens 274 is fixed to a frame 276 by a screw 275. Similarly, the focus detection module 208 is fixed to the frame 276 by screws 277 and 278. The diaphragm 270, the master lens group 211 and the low-pass filter 271 are fixed in a support cylinder 279 provided along the optical axis 257 in the main body 268 of the camera.

Light from the object passes through the front lens 203, the variator 204 and the compensator 205, and most of the light advances through the half prism 269 and attains the photographing CCD 215 through the master lens group 211 and the low-pass filter 271. On the other hand, part of the light turned at the right angle with the optical axis 257 through the half mirror 269 is reflected on the total reflection mirror 273, passes through the imaging lens 274 and attains the focus detection module 208 containing the AF CCD line sensors and the like.

FIG. 16 is a schematic diagram for explaining operation processing performed by a system controller 280 as a control center comprising a microcomputer, contained in the main body 268 of the camera and also explaining control for driving the variator 204 and the compensator 205. A zoom operation key portion 282 is represented as having a tele switch 282A for zooming in the tele direction and a wide switch 282B for zooming in the wide direction. The zoom operation key portion 282 corresponds to the zoom/focus ring 250 in the case of the auto focus mode of the hold switch 252 in FIG. 13. When the ring 250 is rotated in the direction of the arrow "d" or in the direction of the arrow "e", the tele switch 282A or the wide switch 282B is turned on.

The focus detection module 208 comprises a condenser lens 283 for conversing light through different portion of the imaging lens 274, an aperture mask 284, a reimaging lens 285 and the CCD line sensors 286. A relative positional relation between two images of the object formed on the CCD line sensors 286 is detected so that a deviation amount and a deviation direction with respect to a focus position can be detected. This method of focus detection is disclosed in Japanese Patent Laying-Open No. 4914/1985. The zoom motor 264 and the focus motor 265 are driven by a zoom motor drive circuit 287 and a focus motor drive circuit 288, respectively. The focus motor 265 is formed by a step motor for example. However, it is not limited thereto.

Figures 17A, 17B:
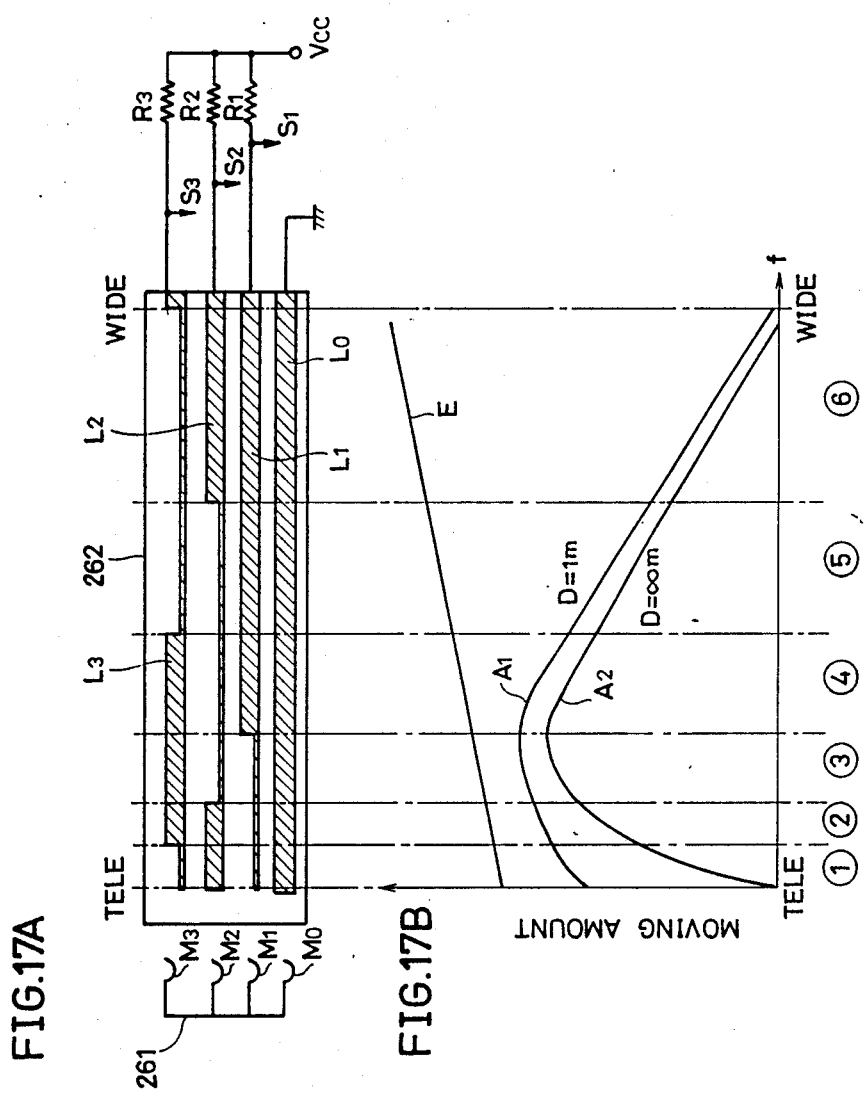
FIG. 17A shows a configuration of a zoom encoder shown in FIG. 16.
FIG. 17B shows moving amounts of the variator lens and the compensator lens corresponding to the zones of the zoom encoder shown in FIG. 17A.

FIG. 17A shows a structure of the zoom encoder 262 shown in FIG. 16. The zoom encoder 262 is formed in a manner in which contact pieces of conductive material form a gray code by their combinations. The contact pieces are a common contact piece L0 grounded, a first contact piece L1, a second contact piece L2 and a third contact piece L3 connected to a power supply Vcc through resistors R1, R2 and R3, respectively. All those contact pieces are provided on a flexible print circuit board for example. The brush 261 of the variator 204 as described previously has four contact elements M0, M1, M2 and M3 integrally formed of a conductive material, corresponding to the common contact piece L0 and the first to third contact pieces L1 to L3 of the zoom encoder 262, respectively, so as to be in contact therewith. The contact pieces L1, L2 and L3 each have two different widths, the smaller width being less than a half of the larger width. Thus, the corresponding contact elements of the brush 261 do not touch the contact pieces of the zoom encoder 262 in regions where they have the smaller width. As a result, signals S1, S2 and S3 provided at outputs of the contact pieces L1, L2 and L3, respectively, attain a high level. On the other hand, the contact elements of the brush 261 touch the contact pieces in regions where they have the larger width. Consequently, the signals S1, S2 and S2 at the outputs fall to a ground level (i.e., a low level) through the brush 261 and the common contact L0. Data (3-bit signals) formed by combinations of the output signals S1, S2 and S3 are changed in various manners dependent on patterns of the first to third contact pieces L1 to L3. Six zones ① to ⑥ classified by those combinations and data concerning the tele end and the wide end (in FIG. 18) are used not only for control of the variator 204 but also as position signals for controlling a moving speed of the compensator 205. In FIG. 17A, the tele end and the wide end are represented oppositely to the arrangement in FIG. 15 or FIG. 16. In other words, in FIGS. 15 and 16, the right side corresponds to the tele direction and the left side corresponds to the wide direction.

FIG. 17B shows a relation between a moving amount of the variator 204 and that of the compensator 205 for maintaining the focusing position unchanged when the variator 204 is driven for zooming, the relation in FIG. 17B corresponding to the zones ① to ⑥ of the zoom encoder 262 shown in FIG. 17A. In FIG. 17B, the straight line E represents a movement of the variator 204 and the curves A1 and A2 represent movements of the compensator 205 in the cases of a distance D to an object being D=1 m and D=∞. The abscissa represents a focal length f and the ordinate represents a moving amount.

Figures 18, 19:
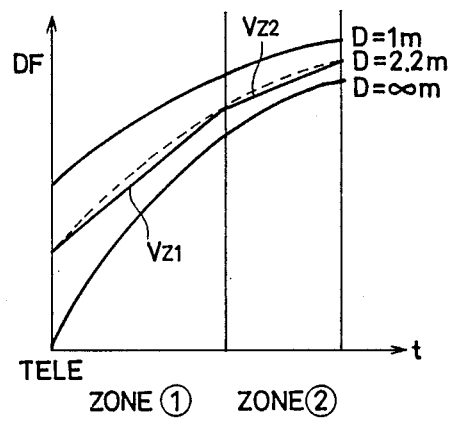
FIG. 18 is a table showing codes corresponding to the respective zones and the like shown in FIGS. 17A and 17B.
FIG. 19 is a graph showing basic speeds of the compensator lens corresponding to the respective zones in the second embodiment of the present invention.
Figure 20A:
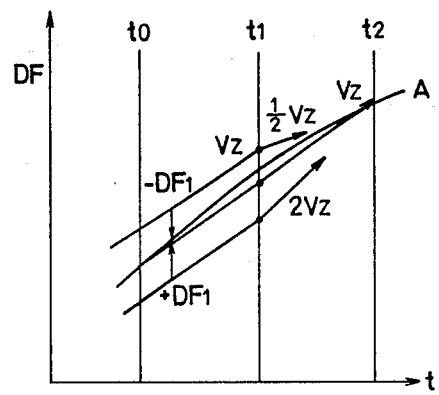
FIGS. 20A and 20D show actual follow-up operation with respect to an ideal curve of the compensator lens for the respective zones in the second embodiment of the present invention.
Figure 20B:
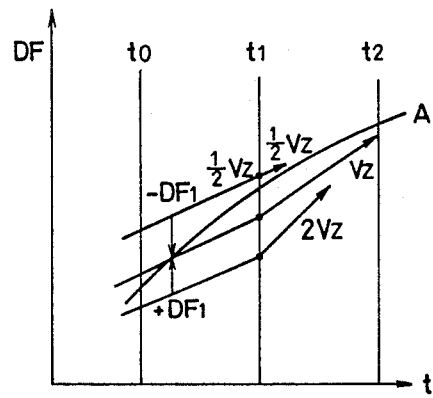
Figure 20C:
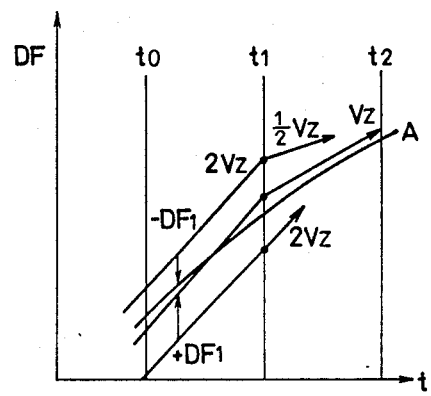
Figure 20D:
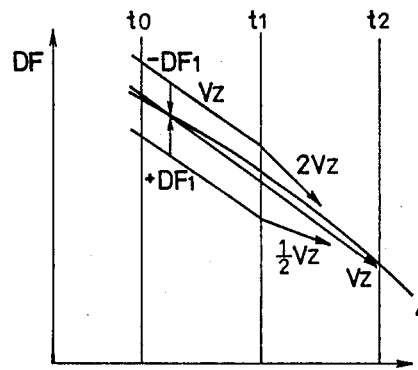

Now, a principle of focus correction during zooming in this second embodiment will be described referring to FIGS. 19 and 20. First, basic speeds different for the respective zones ① to ⑥ shown in FIG. 17B are stored beforehand in a ROM in the system controller 280. Each basic speed is represented by an average inclination of an ideal follow-up characteristic of the compensator 205 in the zone concerned. Referring to FIG. 19, a basic speed is represented by an inclination corresponding approximately to an intermediate value between D=1 m and D=∞ as the distance D to the object. For example, it is represented by an inclination Vzn corresponding to D=2.2 m (n being a zone number). Further, the inclinations of the curves on the moving characteristic of the compensator 205 are different dependent on the distance D to the object and as shown in FIG. 19, the difference is largest at the tele end. In addition, since the number of zones divided is limited, a line segment in one zone is often curved. Taken such situation into consideration, the basic speed Vzn is used at first for control of the movement of the compensator 205. Then, the moving speed is controlled to be K·Vzn (K=K1 or K2, 0<K1<1<K2) according to results of focus detection. For example, referring to FIGS. 20A to 20C, t0, t1 and t2 represent times at the end of the calculation; a curve A represents an ideal follow-up curve of the compensator 205; Vz represents a basic speed of the compensator 205 in the zone concerned; =DF1 and −DF1 represent defocus amounts corresponding to deviations from the ideal follow-up curve A detected at the time t1; and the times t0, t1 and t2 exist in a period corresponding to the same zone. As shown in FIG. 20A, if the compensator 205 is driven at the basic speed Vz at t0 and a defocus amount larger than +DF1 is detected at t1, it is determined that the deviation is large, and the speed is doubled as 2 Vz so as to approach the ideal follow-up curve A. On the other hand, if a defocus amount smaller than −DF1 is detected at t1, the speed is decreased to a half (Vz/2) at t1. If a defocus amount larger than a prescribed value |DF1| cannot be detected at t1, it is determined that the deviation is small and the same speed is maintained. As shown in FIG. 20B, if the compensator 205 is driven at the speed Vz/2 changed at t0, it is determined that the deviation amount is sufficiently large to increase the difference from the ideal follow-up curve A if the defocus amount larger than +DF1 is detected at t1. Then, the speed is increased to 2 Vz. On the contrary, if the defocus amount smaller than −DF1 is detected at t1, it is determined that although the deviation is large, it tends to be decreased. Then, the moving amount is caused to approach the curve A with the speed being maintained at Vz/2. If the defocus larger than the prescribed value |DF1| cannot be detected at t1, it is determined that although the deviation is small, it tends to be increased. Then, the speed is set again to Vz. Also in the cases of FIGS. 20C and 20D, the moving speed is changed so as to decrease the deviation. The above described control processing is performed for the basic speed Vzn in each zone, thereby to appropriately maintain the follow-up characteristic of the compensator 205 during zooming. In the foregoing, the moving speed is changed to the value twice as large or the half value dependent on the detected defocus amount and thus the moving speed is controlled to be changed to the three values including the basic speed. However, the follow-up characteristic can be further improved by changing the moving speed more finely.

Referring to flow charts of FIGS. 21A and 21B, operation for focus correction will be described. In this flow chart, the steps S1 to S9 are the same as those in the case of a normal auto focus mode without zooming operation. When any of the REC button, the PAUSE button and the REC-REVIEW button of the control switch 26 on the upper surface of the camera is operated, the power supply in the camera is turned on. Thus, the system controller 280 start the processing flow in FIG. 21. First in the step S1, integration in the CCD line sensors 286 is performed and charge is stored while the light from the object received in the focus detection area is photoelectrically converted. When the charge stored in the CCD line sensors 286 attains a level sufficiently high for focus detection, the integration is stopped and the charge is transferred to the system controller 280 as a signal of an object image. The system controller 280 converts the signal from the CCD line sensors 286 to digital data and then the data is written in an internal memory (corresponding to data dumping in the step S2). Subsequently, the system controller 280 performs calculation of correlation (in the step S3) based on the data in the memory. A distance between two images formed by the two reimaging lenses 285 in the focus detection module 208 is obtained by the calculation of correlation. More specifically, a maximum correlative position between the two image outputs is obtained by changing the position of one of them with respect to that of the other for each pitch of one picture element from a reference position. Assuming that a distance between the images in an in-focus condition (i.e., a reference distance of images) is L0, the distance in a rear focus condition is larger than L0 and the distance in a front focus condition is smaller than L0, whereby a defocus amount and a defocus direction can be detected. The in-focus condition is shown in FIG. 3 concerning the first embodiment. Subsequently, calculation of interpolation (in the step S4) is performed to calculate a maximum correlative position as a value represented down to decimals based on the maximum correlative position obtained in the step S3 and forward and backward shift positions thereof. The defocus amount is determined by a difference between the thus calculated value and L0. Subsequently in the step S5, the defocus amount represented by the unit corresponding to a picture element pitch of the CCD is converted to an amount represented by a micron unit as a deviation amount on the focal plane. Then, in the step S6, the states zoom operation key portion 282 and the zoom encoder 262 is read. If it is determined in the step S7 that the zoom operation key portion 282 is operated, the processing flow proceeds to a zoom routine. If it is determined that the zoom operation key portion 282 is not operated, the flow proceeds to an AF routine. In the AF routine, the defocus amount obtained in the step S5 is converted to an amount necessary for driving the focus motor 265 shown in FIG. 16 to set an in-focus condition (in the step S8). Since a step motor is used as the focus motor 265 in this embodiment, a pulse count value obtained by converting the defocus amount to a number of driving pulses is used as an amount for driving the motor. The focus motor 265 is driven based on the defocus direction determined in the step S4 and the drive amount obtained in the step S8. As a result, the compensator 205 is moved to perform operation for setting the in-focus condition.

Figure 22:
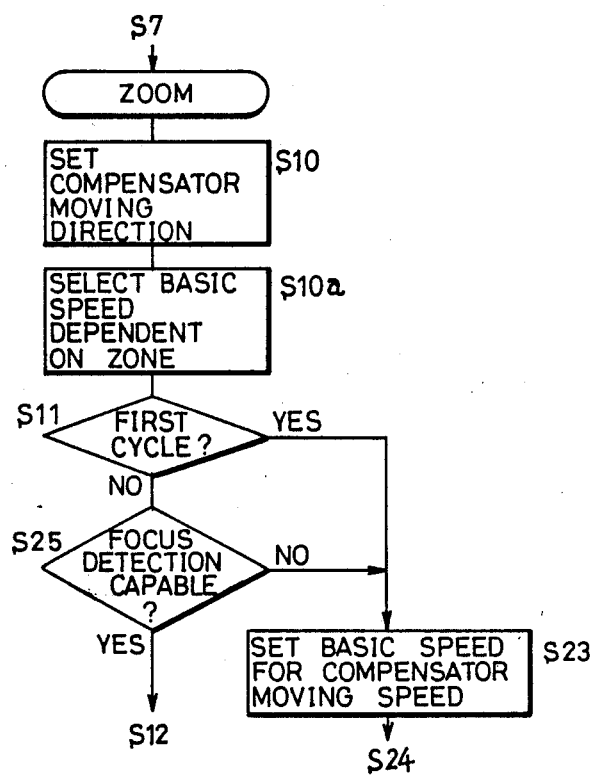
FIG. 22 is a flow chart showing a partial variant of the flow chart shown in FIG. 21.

The above described procedures are the same as in the case of the normal AF mode without a zooming operation. If the zoom operation key portion 282 is operated, the flow branches to the zoom routine as shown in FIG. 22 in the step S7. In the following, operation in the zoom routine will be described. First, a moving direction of the compensator 205 is set based on the zooming direction and the present zone (any of the zones ① to ③ or any of the zones ④ to ⑥. For example, if the wide switch 282B is pressed, the compensator 205 is driven in the forward moving direction in the case of any of the zones ① to ③ or in the backward moving direction in the case of any of the zones ④ to ⑥ corresponding to zooming in the wide direction. The moving direction of the compensator 205 is set in the step S10. If zooming is effected from the zone ① to the zone ⑥, the direction is changed reversely at the point of change from the zone ③ to the zone ④. This changing function is performed in the step S10. In addition, a basic speed corresponding to the zone concerned is selected in the step S10a. Then, the moving speed is set in the processing beginning with the step S11. Since there is no information at the start of zooming, it is determined in the step S11 whether the zooming operation to be performed is in the first cycle or not, and the flow proceeds to the step S23. Then, the basic speed corresponding to the zone is set in the step S24 and movements of the variator 204 and the compensator 205 are started simultaneously. After the step S24, the flow returns to the step S1 and then the above processing is repeated.

As described above, since there is no defocus amount to be detected by zooming at the start of the first zooming operation, the compensator 205 is driven at the basic speed without regard to a first defocus amount on the assumption that the zooming is started in the in-focus condition in this embodiment. In the meantime, the zoom operation key 282 is continuously pressed. Accordingly, after the flow enters the zoom routine through the steps S6 and S7 in the second cycle, the moving direction of the compensator 205 is set in the step S10 in the same manner as in the previous cycle. Then, the step S10a is executed and since it is determined in the step S11 that the zooming operation is in the second cycle, the flow proceeds to the step S12. In the step S12, it is determined whether the zone of the encoder 262 detected in the step S6 is the same as in the previous cycle. If it is the same, the flow proceeds to the step S12a. If the zone is changed, the flow proceeds to the step S23 to set the basic speed. Further, if the zooming direction is changed (in the step S12a), the result of focus detection obtained is not reliable and therefore the basic speed is set. This is because there is a possibility that integration may be performed when the direction is changed reversely. Those steps S12 and S12a are provided considering that setting to the basic speed in each zone effectively decreases an error in movement when the zone or the direction is changed. The compensator 205 may be driven in the step S24, not in the step S23 where the zooming direction is changed, at the speed with which the compensator 205 have been driven. This driving method will be also effectively used when the variator 204 comes out of a specified zone where setting has been made appropriately.

Focus correction operation in the second cycle or a cycle subsequent thereto in the same zone will be described hereinafter for each of the following five cases.

(i) If the detected defocus amount is small in the same zone, the compensator 205 is driven at the basic speed for that zone. More specifically, it is determined that the conditions in the steps S12 and S12a are not satisfied and the flow proceeds to the step S13, where it is determined that the result of the determination in the step S13 is YES since |DF|<1. Then, the flow proceeds to the step S23 to set the basic speed and then the compensator 205 and the variator 204 are driven in the step S24. The moving speeds of the variator 204 and the compensator 205 are set again in the step S24 with the variator 204 and the compensator 205 being continuously driven in the second cycle and the cycles subsequent thereto.

(ii) If zooming in the wide direction is applied and the detected defocus amount in any of the zones ① to ③ has a large value, the speed is changed. This case corresponds to FIGS. 20A to 20C. More specifically, the results of the determination in the steps S12 and S12a are NO and the flow proceeds to the step S13, where the result of the determination is NO since |DF|≧1. Then, the flow proceeds to the step S14 to determine the zone. Since the zone concerned is any of the zones ① to ③, the flow proceeds to the step S15 where the zooming in the wide direction is determined. Then, the flow proceeds to the step S18. In the step S18, it is determined that a defocus direction is a positive direction if +DF is detected, and then the flow proceeds to the step S22 to set the moving speed to the value 2 Vz twice as large as the basic speed, whereby the compensator 205 and the variator 204 are driven in the step S24.

On the contrary, if −DF is detected, it is determined in the step S18 that the direction is a negative direction, and the flow proceeds to the step S21 to set the moving speed to the value Vz/2, i.e., the half of the basic speed, whereby the driving in the step S24 is performed.

(iii) If zooming in the wide direction is applied and the detected defocus amount in any of the zones ④ to ⑥ has a large value, the speed is changed. This case corresponds to FIG. 20D. More specifically, after the moving direction of the compensator 205 opposite to that in the above described case (ii) is set in the step S10, the step S10a is executed and if the result of the determination in the step S11 is NO and if the respective results of the determination in the steps S12, S12a and S13 are NO, the flow proceeds to the step S14. Since the zone concerned is any of the zones ④ to ⑥ in the step S14, the flow proceeds to the step S16, where the zooming in the wide direction is determined. Then, the flow proceeds to the S19. If +DF is determined in the step S19, the flow proceeds to the step S21 to set the moving speed to the value Vz/2, i.e., half of the basic speed, whereby the driving in the step S24 is performed.

(iv) If zooming in the tele direction is applied and the detected defocus amount in any of the zones ④ to ⑥ has a large value, the speed is changed. The control operation in this case is performed oppositely to the above indicated case (iii). More specifically, the driving direction of the compensator 205 opposite to that in the case (iii) is set in the step S10 and after the results of the determination in the steps S11, S12, S12a and S13 are all NO, the flow proceeds to the step S14. Since the zone concerned is any of the zones ④ to ⑥ in the step S14, the flow proceeds to the step S16, where the zooming in the tele direction is determined. Then, the flow proceeds to the step S20. In this case, if +DF is determined oppositely to the case (iii), the flow proceeds to the step S22 to set the speed to the value 2 Vz which is twice as large as the basic speed. If −DF is detected, the flow proceeds to the step S21 to set the speed to the value Vz/2 which is the half of the basic speed. Thus, the moving speed is controlled to approach the ideal follow-up curve A, whereby the driving in the step S24 is performed.

(v) If zooming in the tele direction is applied and the detected defocus amount in any of the zones ① to ③ has a large value, the speed is changed. In this case, control operation is performed oppositely to the above described case (ii). More specifically, the moving direction of the compensator 205 opposite to that in the case (ii) is set in the step S10 and the step S10a is executed. Then, if the results of the determination in the steps S11, S12, S12a and S13 are all NO, the flow proceeds to the step S14. Since the zone concerned is any of the zones ① to ③ in the step S14, the flow proceeds to the step S15 and then to the step S17. Oppositely to the case (ii), if +DF is detected, the flow proceeds to the step S21 to set the moving speed to the value Vz/2 which is the half of the basic speed. If −DF is detected, the flow proceeds to the step S22 to set the moving speed to the value 2 Vz which is twice as large as the basic speed. Thus, the moving speed is controlled to approach the ideal follow-up curve A, whereby the driving in the step S24 is performed.

As described above, the speed is controlled to approach the ideal follow-up curve A in any case.

When the zooming operation is completed and the zoom operation key portion 282 is turned off, this fact is detected in the step S6. After that, the flow proceeds to the AF routine in the step S7, so that normal AF operation in the steps S8 and S9 is performed. In the step S9, the compensator 205 is driven and the variator 204 is stopped, whereby zooming is terminated. If a defocus amount is caused by any factor during the zooming, correction is made in the normal AF operation.

Figure 24:
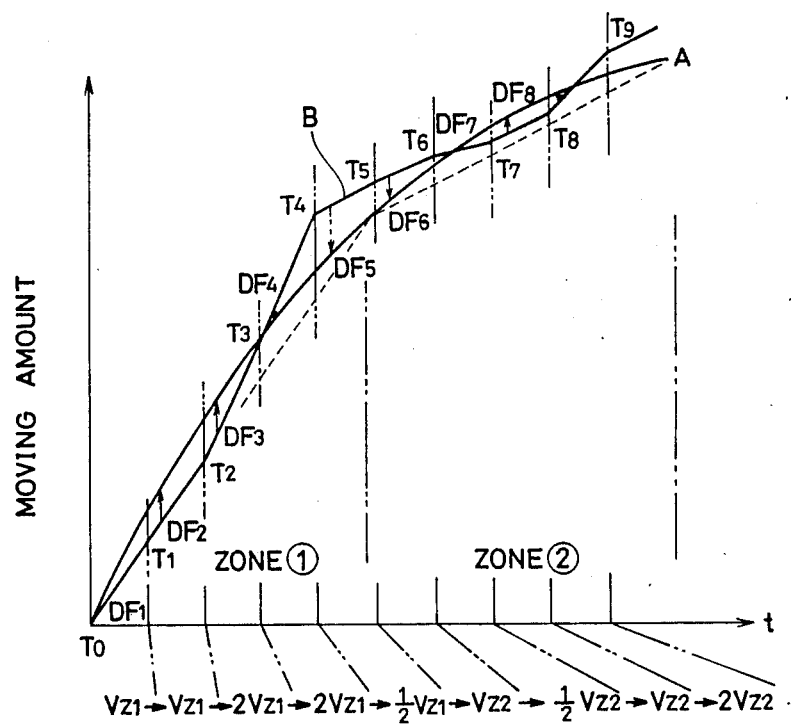
FIG. 24 shows actual follow-up operation with respect to an ideal curve of the compensator lens in the second embodiment of the present invention, in comparison with FIG. 1.

Thus, the follow-up operation of the compensator (i.e., the focus correction) during zooming is performed. FIG. 24 shows follow-up characteristics for the zones ① and ② in the case of performing the above described speed control. Referring to FIG. 24, the follow-up characteristics of the compensator 205 are shown in the case of zooming from the tele end toward the wide direction by using the zoom lens unit having the same moving characteristics of the compensator as in FIG. 1. When the zooming is started in the in-focus condition, it is first determined that the wide switch 282B is pressed. Then, the variator 204 is moved in the wide direction and, at the same time, the moving direction of the compensator 205 is determined so that the compensator 205 is driven at a basic speed Vz. Speed control after the time T1 is performed in the following manner.

(I) The basic speed $Vz_1$ is set between $T_0$ and $T_1$.

(II) The basic speed $Vz_1$ is set when $DF_1$ ($<1$) is detected at $T_1$.

(III) The speed 2 $Vz_1$ is selected when $DF_2$ ($\geqq 1$) is detected at $T_2$.

(IV) The speed 2 $Vz_1$ is selected when $DF_3$ ($\geqq 1$) is detected at $T_3$.

(V) The speed $Vz_1/2$ is selected when $DF_4$ ($|DF_4| \geqq 1$) is detected at $T_4$.

(VI) The basic speed $Vz_2$ is set when change of the zone is detected at $T_5$.

(VII) The speed $Vz_2/2$ is set when $DF_6$ ($|DF_6| \geqq 1$) is detected at $T_6$.

(VIII) The basic speed $Vz_2$ is set when $DF_7$ ($<1$) is detected at $T_7$.

(IX) The speed 2 $Vz_2$ is selected when $DF_8$ ($\geqq 1$) is detected at $T_8$.

Figure 1:
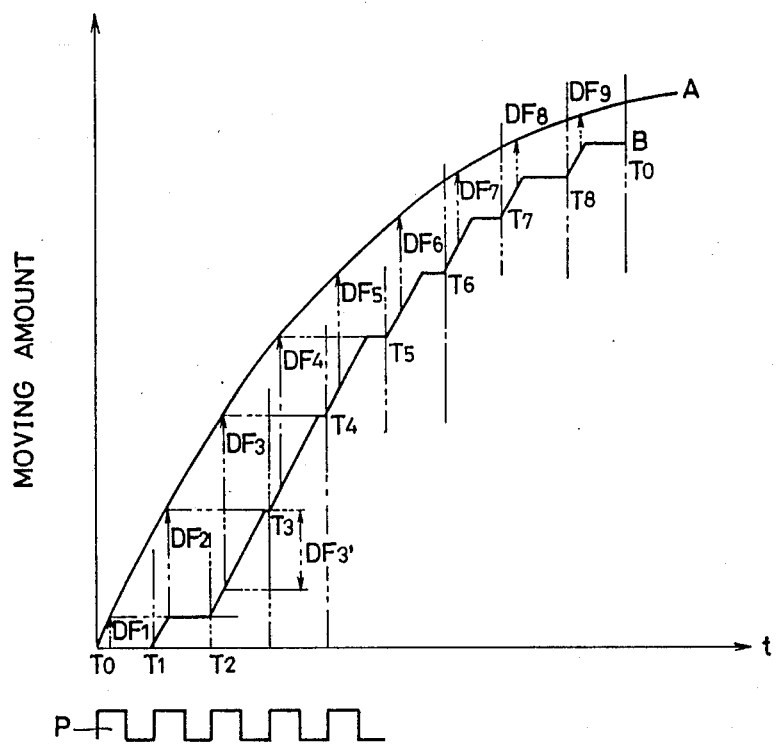
FIG. 1 is a graph showing a follow-up characteristic of a conventional compensator lens, where actual delays in follow-up with respect to an ideal follow-up curve are shown.

In the case of FIG. 24, the compensator 205 is continuously moved as compared with the case of FIG. 1. More specifically, in the case of FIG. 1, the compensator 205 is moved successively by repeating the cycle of focus detection, movement and stop, in which the compensator 205 is moved by a defocus amount calculated based on the output of focus detection and then temporarily stopped to wait for another result of focus detection. On the other hand, in the case of FIG. 24, the compensator 205 is not stopped and is continuously moved, and during the movement, the moving speed of the compensator 205 is controlled to be changed. In the above described manner, focus control exhibiting a good follow-up characteristic is attained during zooming. In the present embodiment, the ROM in the system controller 280 needs only to have the basic speeds for the six zones ① to ⑥. In the case of FIG. 24, the multiplication method by such coefficients as ½ and 2 for the basic speeds Vz1 and Vz2 of the zones ① and ②, respectively, is the same in both of the zones. However, the multiplication method can be changed for each zone. In addition, the zoom lens unit 255 does not need to be incorporated in the main body of the camera as in the present embodiment, as shown in FIGS. 10 to 12. The zoom lens unit 255 may be attached on the outside of the camera in an interchangeable manner. In such a case, coefficients K1 and K2 suitable for selecting a zoom lens unit may be stored in the ROM so that speed control can be made according to the most suitable follow-up curve for each zoom lens unit.

Figure 21A:
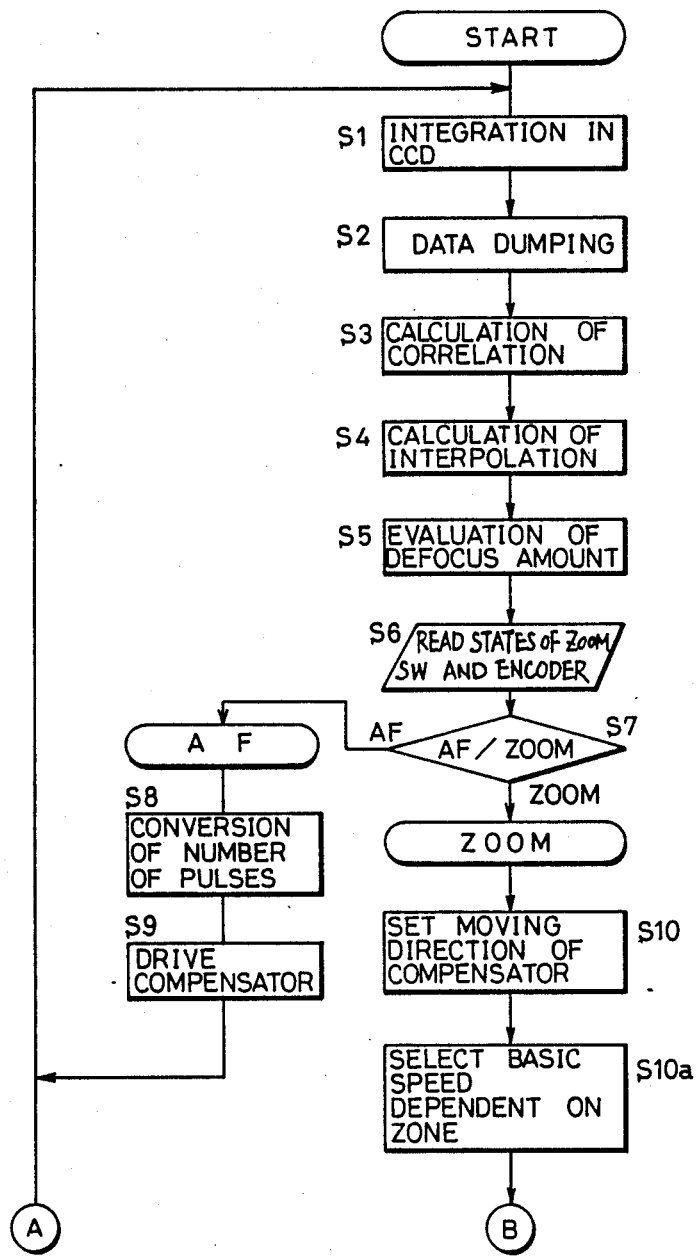
FIGS. 21A and 21B are flow charts showing focus correction operation in the second embodiment of the present invention.
Figure 21B:
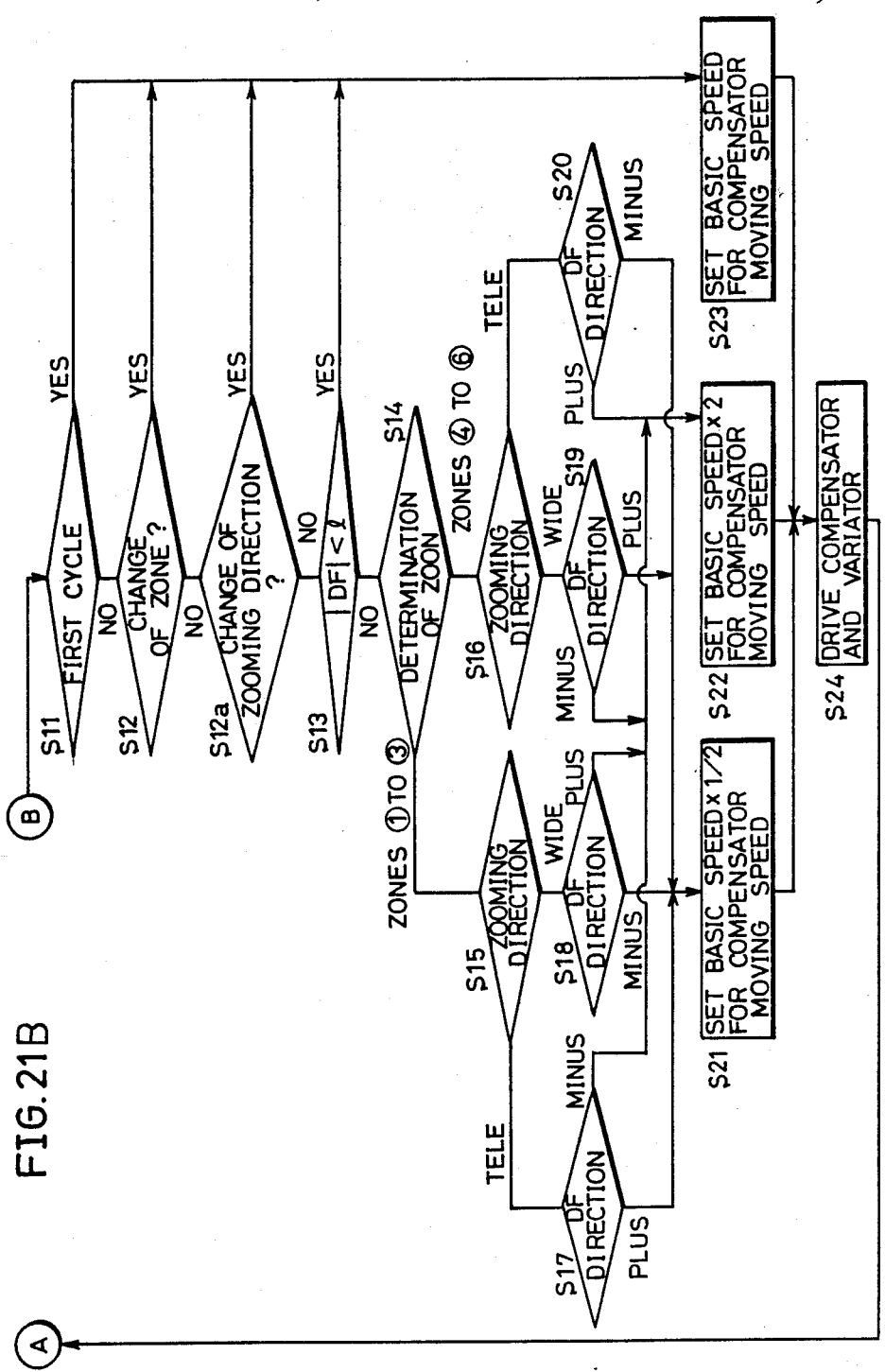

Processing to be performed if focus detection is incapable in the flow of FIGS. 21A and 21B is as indicated in FIG. 22. More specifically, a step S25 for determining whether focus detection is capable or not is provided between the steps S11 and S12. If focus detection is capable, the flow proceeds to the step S12. If focus detection is incapable, the flow proceeds to the step S23 so that the compensator 205 is driven at the basic speed. If the above described processing is applied, there is an advantage that a large error in follow-up does not occur even if focus detection is rendered incapable temporarily due to a change in information of an object image in a focus detection area as a result of change in a view angle during zooming. In addition, if focus detection is capable after that and a result of detection is obtained, the flow proceeds to the routine beginning with the step S12. Thus, a follow-up operation can be continued by speed control performed thereafter.

Figure 23:
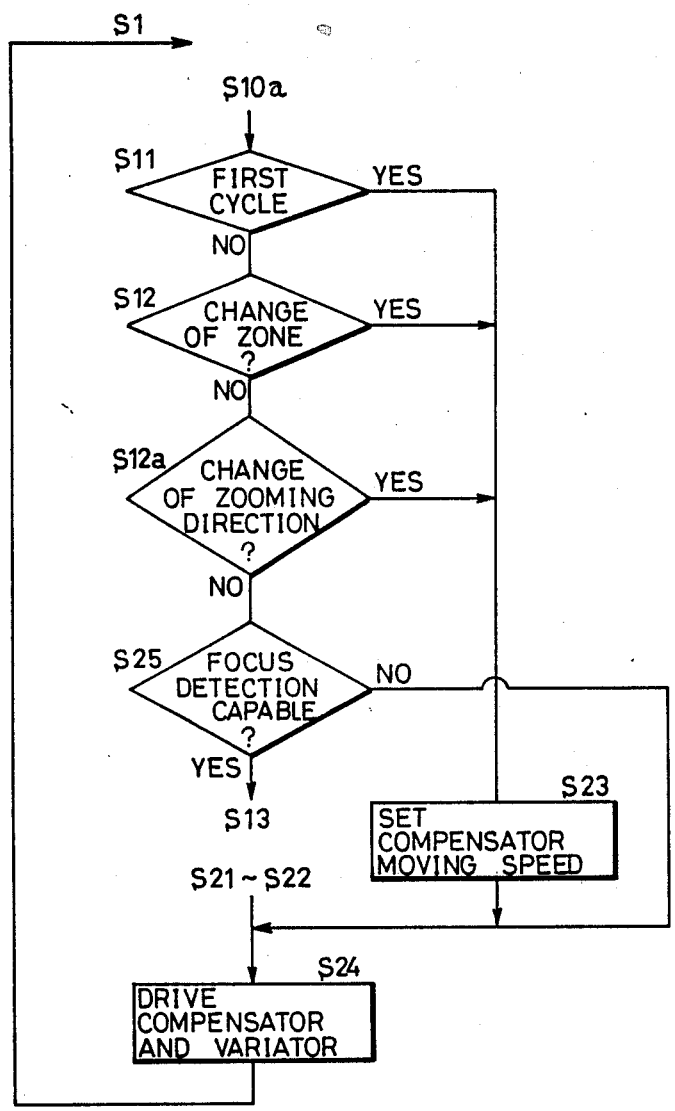
FIG. 23 is a flow chart showing another partial variant of the flow chart shown in FIG. 21.

In addition, as shown in FIG. 23, the step S25 for determining whether focus detection is capable or not may be provided between the steps S12a and S13. In this case, if focus detection is capable, the flow proceeds to the step S13. If focus detection is incapable, the flow skips to the step S24 to drive the compensator 205 and the variator 204 with the previously set speeds being maintained. This case has the same advantage as in the case of FIG. 22.

Although the present invention is described in connection with the video camera in the foregoing, the present invention is not limited thereto. It is applicable to a conventional camera with film.

Figure 25:
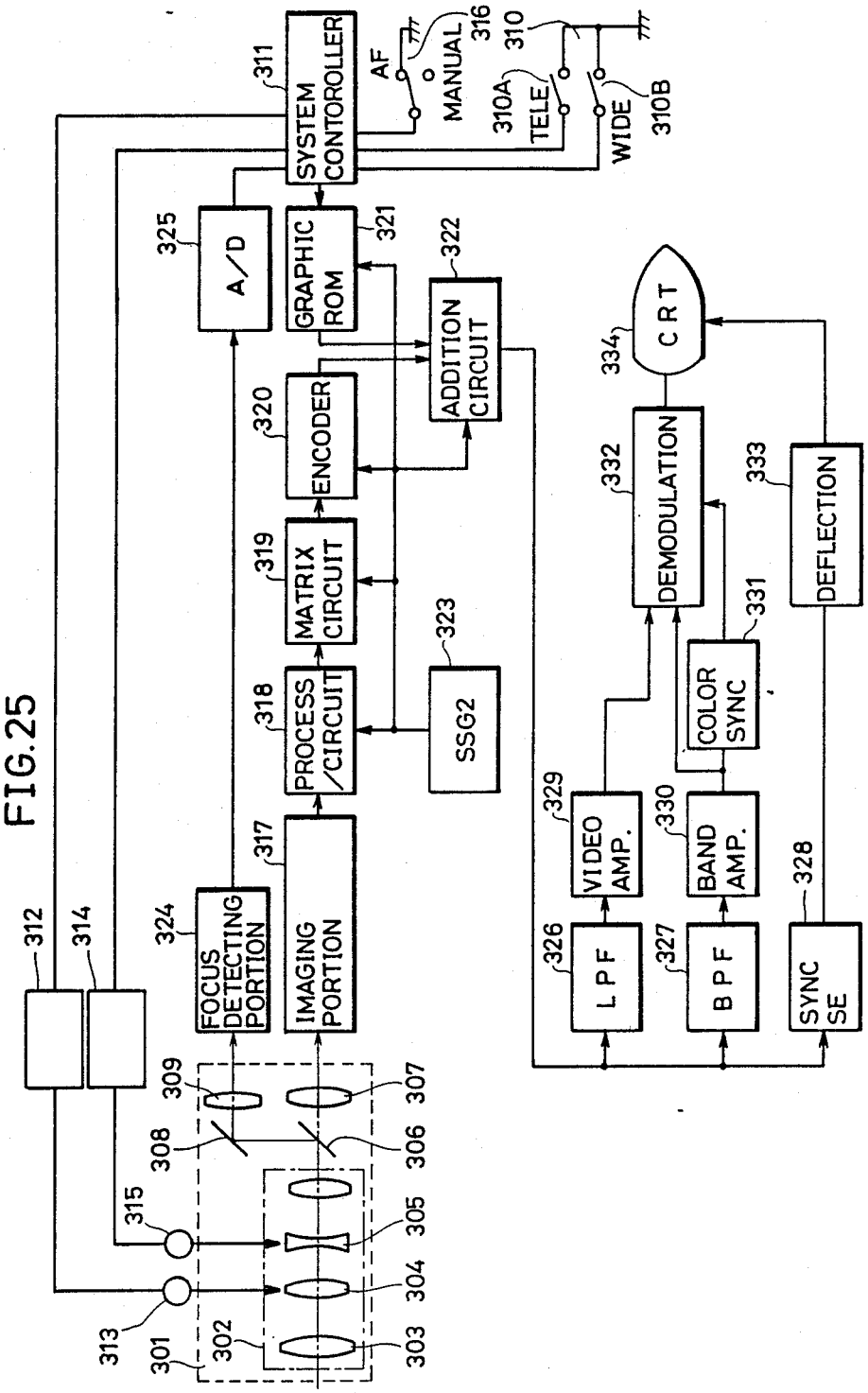
FIG. 25 is a diagram schematically showing an entire construction of a video camera according to a third embodiment of the present invention.

Third Embodiment:

FIG. 25 is a schematic diagram showing an entire construction of a video camera according to the third embodiment of the present invention. An optical system 301 comprises a zoom lens unit 302 including a front lens 303, a variator 304 for variable magnification and a compensator 305 for compensation for a position of an image pickup face in order from the front side of the camera. The optical system 301 further comprises, in a main body of the camera, a prism 306, a master lens group 307, a total reflection mirror 308 for focus detection and an imaging lens 309. The variator 304 and the compensator 305 are provided in a movable manner. The variator 304 comprises a variable magnification lens group and it changes a focal length when it moves. The compensator 305 comprises a focus lens group and functions to compensate for a change of the position of the image pickup face caused by the movement of the variator 304. In this third embodiment, the variator 304 and the compensator 305 are driven independently by different drive means. More specifically, the variator 304 is driven in a manner in which a system controller 311 operates a zoom motor drive circuit 312 by operation of a zoom operation key group 310 to rotate a zoom motor 313. On the other hand, the compensator 305 is driven in a manner in which the system controller 311 calculates a defocus amount based on a focus detection signal obtained from a focus detecting portion 324 to be described below and an AF motor drive circuit 314 is operated based on the result of the calculation to rotate an AF motor 315. The zoom operation key group 310 comprises a first switch 310A for moving the variator 304 in the tele direction (i.e., rightward in FIG. 25) and a second switch 310B for moving the variator 304 in the wide direction (i.e., leftward in FIG. 25). For focus adjustment, a manual mode and an AF mode can be selected by using a mode selection switch 316. In the following description, it is assumed that the switch 316 is set to the AF mode.

Figure 28A:
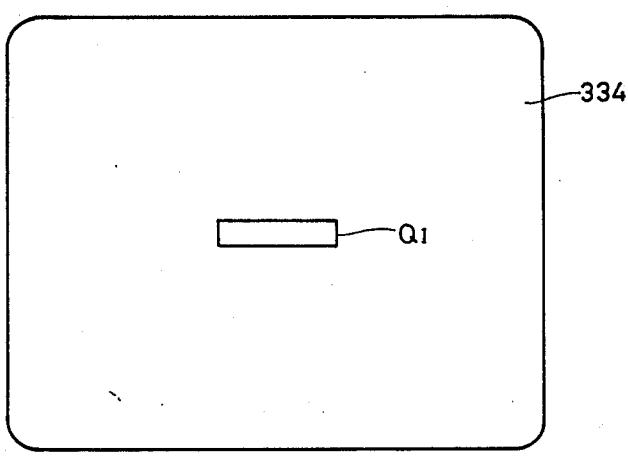
FIGS. 28A and 28B show focus detection area indicating marks displayed in a view finder of the third embodiment of the present invention.
Figure 28B:
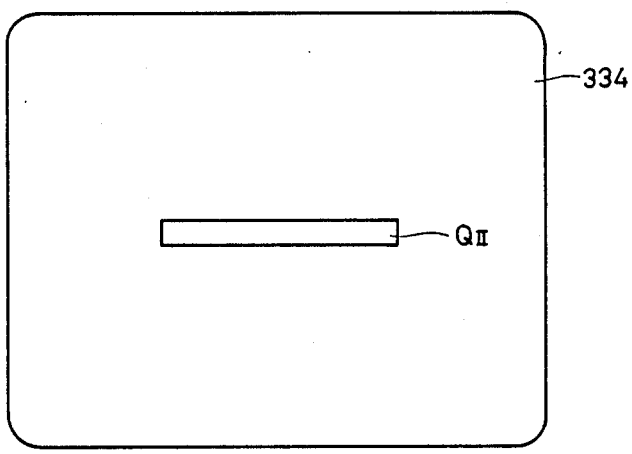

Referring to FIG. 25, an imaging portion 317 has a solid-state image sensor such as a CCD. Light from an object passes through the front lens 303, the variator 304 and the compensator 305 and most of the light advances straight through the prism 306. Then, it attains the imaging portion 317 through the master lens group 307, so that an image is formed. The image is converted to an electric signal by a well-known method and it is scanned by suitable scanning means so that a video signal is outputted. The video signal is supplied to a process circuit 318 in the subsequent stage, where tone control such as $\gamma$ correction or white balance adjustment as well as processing such as automatic gain control is applied. A matrix circuit 319 converts a color signal thus obtained to a color difference signal. A luminance signal and the color difference signal from the matrix circuit 319 are converted to NTSC signals (i.e., signals according to the NTSC color system) by predetermined modulations in an encoder 320. A graphic ROM 321 for storing data corresponding to focus detection area indicating patterns to be displayed in a view finder is connected to the system controller 311. The focus detection area indicating patterns to be displayed in the view finder are a relatively narrow spot area indicating mark as shown in FIG. 28A and a relatively large wide area indicating mark as shown in FIG. 28B as described afterwards, although they are not limited thereto. The graphic data in the graphic ROM 321 is read out by addressing in the system controller 311 comprising a microprocessor, and the data is multiplexed with the NTSC signals in an addition circuit 322. An output signal of the addition circuit 322 is supplied to a low-pass filter 326 for transmitting the luminance signal, a bandpass filter 327 for transmitting a carrier color signal having a passband approximate to 3.58 MHz and a sync separation circuit 328 for extracting horizontal and vertical synchronizing signals. The luminance signal is amplified in a video amplification circuit 329 and the output of the circuit 329 is supplied to a demodulation circuit 332. On the other hand, the carrier color signal transmitted through the bandpass filter 327 is amplified in a band amplifier 330 and the output is supplied to the demodulation circuit 332. At that time, a color-sync circuit 331 generates a continuous wave (i.e., a color sub-carrier wave) having a frequency and a phase synchronizing with a color burst signal extracted from the carrier color signal and supplies the continuous wave to the demodulation circuit 332. The demodulation circuit 332 applies demodulation based on the continuous wave to regain color difference signals R-Y and B-Y. Further, based on a matrix of the color difference signals and the luminance signal, it provides signals of primary colors R (red), G (green) and B (blue), whereby a cathode ray tube 334 is driven. An output of the sync separation circuit 328 is supplied to the cathode ray tube 334 through a deflection circuit 333. The cathode ray tube 334 forms an electronic view finder. It has a small screen which displays an object image onto which the spot area indicating mark QI of FIG. 28A or the wide area indicating mark QII of FIG. 28B as the mark for indicating a selected focus detection area is superimposed.

Referring to FIG. 25, a synchronizing signal generator 323 for generating signals for synchronization with the process circuit 318, the matrix circuit 319, the encoder 320, the graphic ROM 321 and the addition circuit 322 is connected to each other. The focus detecting portion 324 is connected to an A/D converter 325 for converting an analog signal to a digital signal. The digital signal thus obtained is supplied to the system controller 311. The system controller 311 detects operation of the zoom operation key group 310 to operate the zoom motor drive circuit 312; it detects a state set by the mode selection switch 316 to determine a focus adjustment mode; and it reads out graphic data from the graphic ROM 321 to display marks on the screen of the cathode ray tube 334. In addition, the system controller 311 performs other operations such as setting of a focus detection area on the CCD line sensors of the focus detecting portion 324, determination as to whether focus detection is capable or not based on a correlation amount of a focus detection signal, or calculation of a defocus amount.

Part of the light from the object turned at a right angle through the prism 306 is reflected on the total reflection mirror 308 and attains the focus detecting portion 324 through the imaging lens 309. The principle and method for focus detection in this third embodiment are the same as shown in FIGS. 2 and 3 of the first embodiment.

Figure 26:
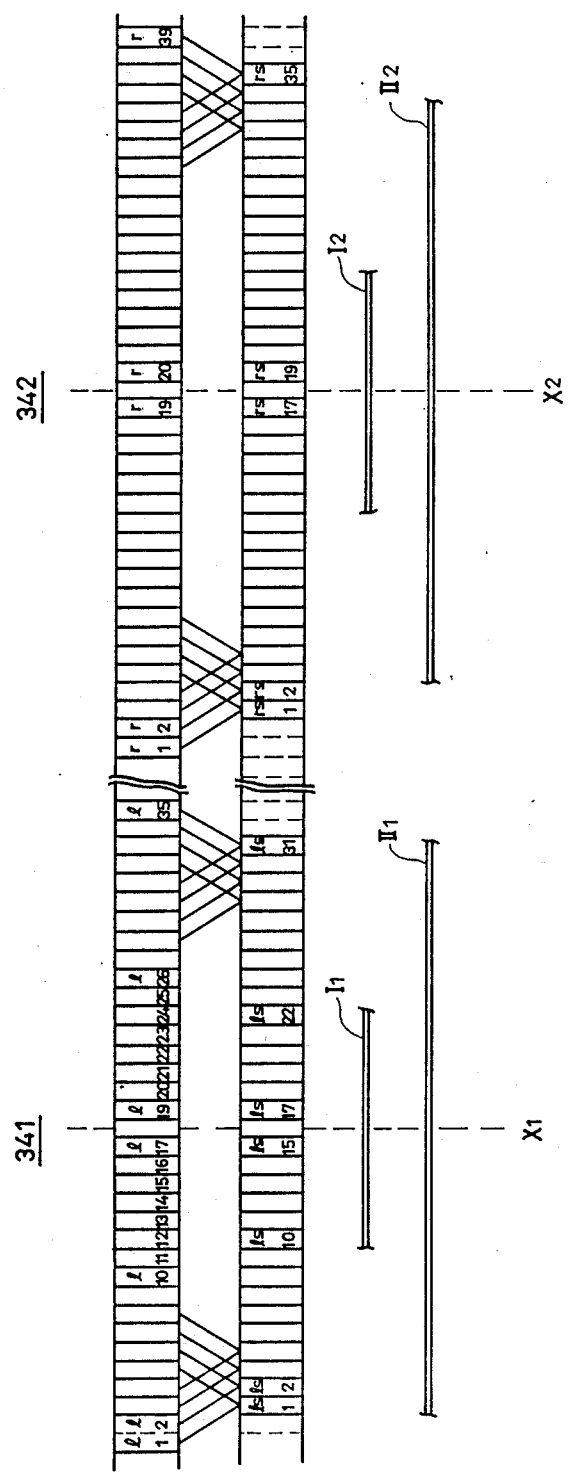
FIG. 26 is an illustration showing a CCD line sensor as well as a basic region, a reference region and focus detection areas set thereon in the third embodiment of the present invention.

Referring now to FIG. 26, description will be made of relations of a basic region 341 and a reference region 342 set in the CCD line sensors 133 shown in FIG. 4, and focus detection areas set in those regions. It is to be noted that the basic region, the reference region and the focus detection areas are only formed on a program of the microprocessor of the system controller 311 and not formed as hardware. In FIG. 26, 35 picture elements l1 to l35 out of all the picture elements of the CCD line sensors 133 are assigned to the basic region 341, while 39 picture elements r1 to r39 are assigned to the reference region 342. The focus detection areas are a larger area and a smaller area, i.e., two areas for each of the regions 341 and 342. The narrow focus detection area is called the spot area and the wide focus detection area is called the wide area. The 17 picture elements l10 to l26 of the CCD line sensors 133 are assigned to the spot area I1 of the basic region 341. Those picture elements correspond to a range enabling use of 13 data from output difference data ls10 of the two picture elements l10 and l14 distant from each other by three picture elements to output difference data ls22 of the two picture elements l22 and l26 also distant from each other by three picture elements.

The 35 picture elements l1 to l35 are assigned to the wide area II1 of the basic region 341 and those picture elements correspond to a range enabling use of 31 data from output difference data ls1 of the two picture elements l1 and l5 distant from each other by three picture elements to output difference data s31 of the two picture elements l31 and l35 also distant from each other by three picture elements.

As for the focus detection area of the reference region 342, picture elements are assigned to the spot area I2 and the wide area II2 in the same manner as in the case of the spot areas I1 and the wide area II2 of the basic region 341. The reference characters X1 and X2 represent lines for indicating optical reference positions (i.e., optical axes).

Description will be now made of determination by the system controller 311 as to a contrast value in the selected focus detection area in the finder and calculation for switching of the focus detection areas. Selection of the spot area or the wide area as the focus detection area depends on whether a value obtained by normalizing a correlation amount (to be described afterwards) by the contrast value is higher than a predetermined value or not. Determination as to an in-focus condition or a defocus condition is effected by checking for deviation in phase based on output signals of the basic region 341 and the reference region 342 set on the CCD line sensors 133. If the object has a small difference in brightness, an output difference of the picture elements in the CCD line sensors 133 is small and noise is mixed in the output, and accordingly, it becomes difficult to determine the in-focus condition. Therefore, the correlation amount between the output of the basic region 341 and that of the reference region 342 is obtained and a value normalized based on the correlation amount is used for the determination. Thus, if the normalized value is higher than the prescribed value, it is determined that the object has a low contrast and then processing is performed again by changing the focus detection area from the spot areas I1 and I2 to the wide areas II1 and II2 for example. In the following, calculation to be performed in this case will be described.

First, output difference data of the two picture element distant from each other by three picture elements in the CCD line sensors 133 is obtained for each of the basic and reference regions 341 and 342. Thus, the difference data $l_{sk}$ in the basic region 342 is represented as follows:

$$l_{sk} = l_k - l_{(k+4)} \text{ (where } k=1 \text{ to } 31)$$

The difference data $r_{sk}$ in the reference region 342 is represented as follows:

$$r_{sk} = r_k - r_{(k+4)} \text{ (where } k=1 \text{ to } 35)$$

Then differences of the respective adjacent two difference data in the basic region 341 are all added, whereby a contrast is obtained. More specifically, the contrast $C_I$ in the spot area I1 is as follows:

$$C_I = \sum_{k=10}^{21} |l_{sk} - l_{s(k+1)}| \quad (1)$$

In the same manner, a contrast $C_{II}$ in the wide area II1 is as follows:

$$C_{II} = \sum_{k=1}^{30} |l_{sk} - l_{s(k+1)}| \quad (2)$$

Then, a correlation amount between the output of the basic region 341 and the output of the reference region 342 is obtained.

A correlation amount $H_I(n)$ of the spot areas is represented as follows:

$$H_I(n) = \sum_{k=1}^{13} |l_{s(k+9)} - r_{s(k+n)}| \quad (3)$$

where n=0 to 22.

The smallest $H_I(nMI)$ out of the correlation amounts $H_I(0)$ to $H_I(22)$ obtained for the respective value n of 0 to 22 is regarded as a portion having the highest correlativity.

$$H_I(nMI) = Min[H_I(0), \ldots, H_I(22)] \quad (4)$$

In the equation (4), the in-focus condition is set when $nMI = 11$ and a difference from this value corresponds to a defocus amount.

Then, it is determined whether the contrast is lower than the reference value or not. For this purpose, the correlation amount $H_I(nMI)$ in the portion having the highest correlativity obtained in the above indicated equation (4) is normalized by the contrast $C_I$ in the basic region obtained in the above indicated equation (1). Thus, even if the accumulation amount of charge in the CCD changes according to luminance of the object to cause a change in the value of $H_I(nMI)$, the above mentioned determination can be made constantly in comparison with the given level. The normalized correlation amount in the portion having the highest correlativity is represented as follows:

$$Y_{MI} = H_I(nMI)/C_I \quad (5)$$

This amount is compared with the predetermined reference level Ys. As a result, if the following relation:

$$Y_{MI} < Ys \quad (6)$$

is determined, it is determined that the contrast permits focus detection in the spot area. On the other hand, if the following relation:

$$Y_{MI} \geq Ys \quad (7)$$

is determined, it is determined that the contrast does not permit focus detection in the spot area. More specifically, if the luminance of the object has a considerably low value, it generally happens that the S/N ratio of the output of the CCD line sensors 133 is deteriorated to cause the result of the measurement to be unstable. In such a case, the value $C_I$ in the equation (5) is decreased and accordingly the value $Y_{MI}$ is increased. In addition, if the object is a wall having no pattern and the like, the difference data of the output of the CCD line sensors 133 indicates no difference and the value $Y_{MI}$ is increased since the value $C_I$ becomes small.

If focus detection is incapable in the spot area as indicated by the equation (7), switching is made from the focus detection area to the wide area.

Similarly to the case of the spot area, a correlation amount between an output of the basic region 341 and an output of the reference region 342 is obtained for the wide area. The correlation amount $H_{II}(n)$ of the wide area is represented as follows:

$$H_{II}(n) = \sum_{k=1}^{31} |l_{sk} - r_{s(k+n)}| \quad (8)$$

where $n = 0$ to 4.

Among the correlation amounts $H_{II}(0)$ to $H_{II}(4)$ obtained for the respective values n of 0 to 4, the smallest $H_{II}(nMII)$ is obtained as the amount in the portion having the highest correlativity.

$$H_{II}(nMII) = Min[H_{II}(0), \ldots, H_{II}(4)] \quad (9)$$

The amount thus obtained is normalized by the contrast in the basic region obtained by the equation (2).

$$Y_{MII} = H_{II}(nMII)/C_{II} \quad (10)$$

The value $Y_{MII}$ obtained by the equation (10) is compared with the predetermined reference value Ys. If the following relation:

$$Y_{MII} < Ys \quad (11)$$

is determined, focus detection is capable. If not, focus detection is incapable.

Figure 27A:
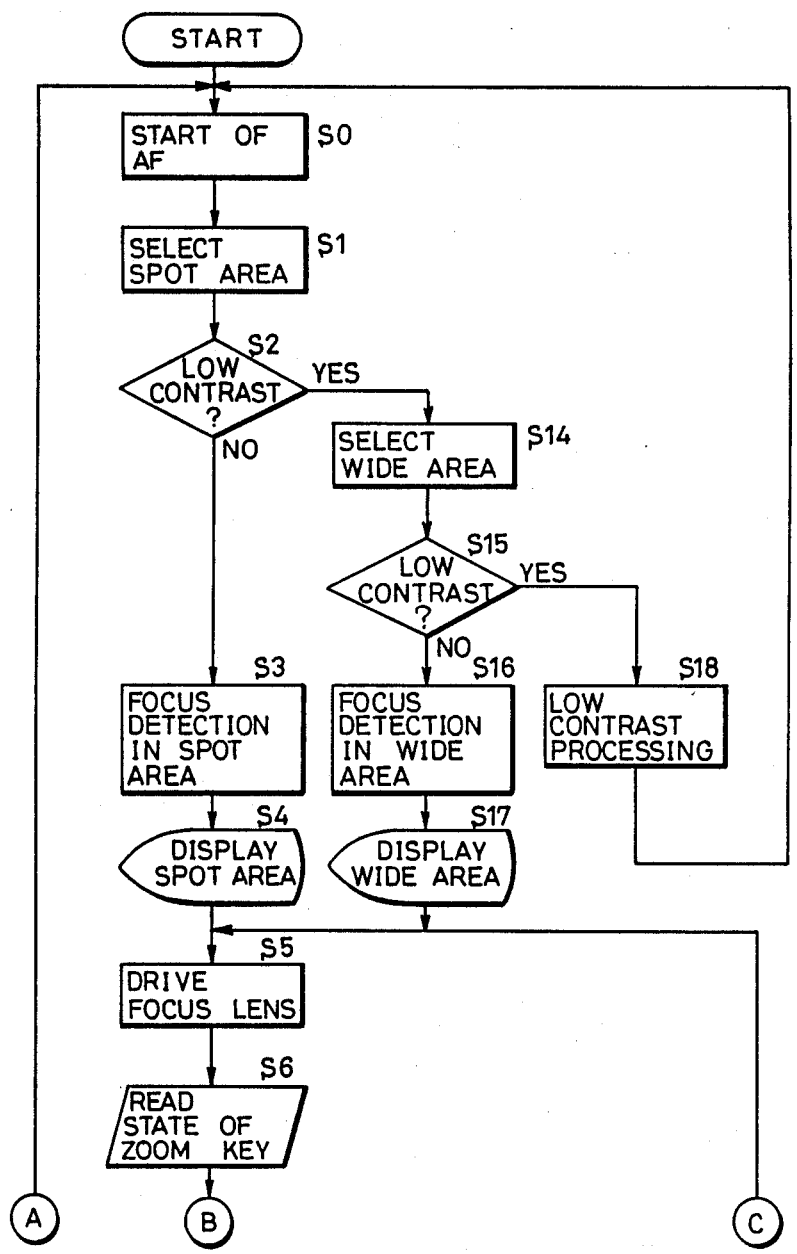
FIGS. 27A and 27B are flow charts showing signal processing and control in a system controller in the third embodiment of the present invention.
Figure 27B:
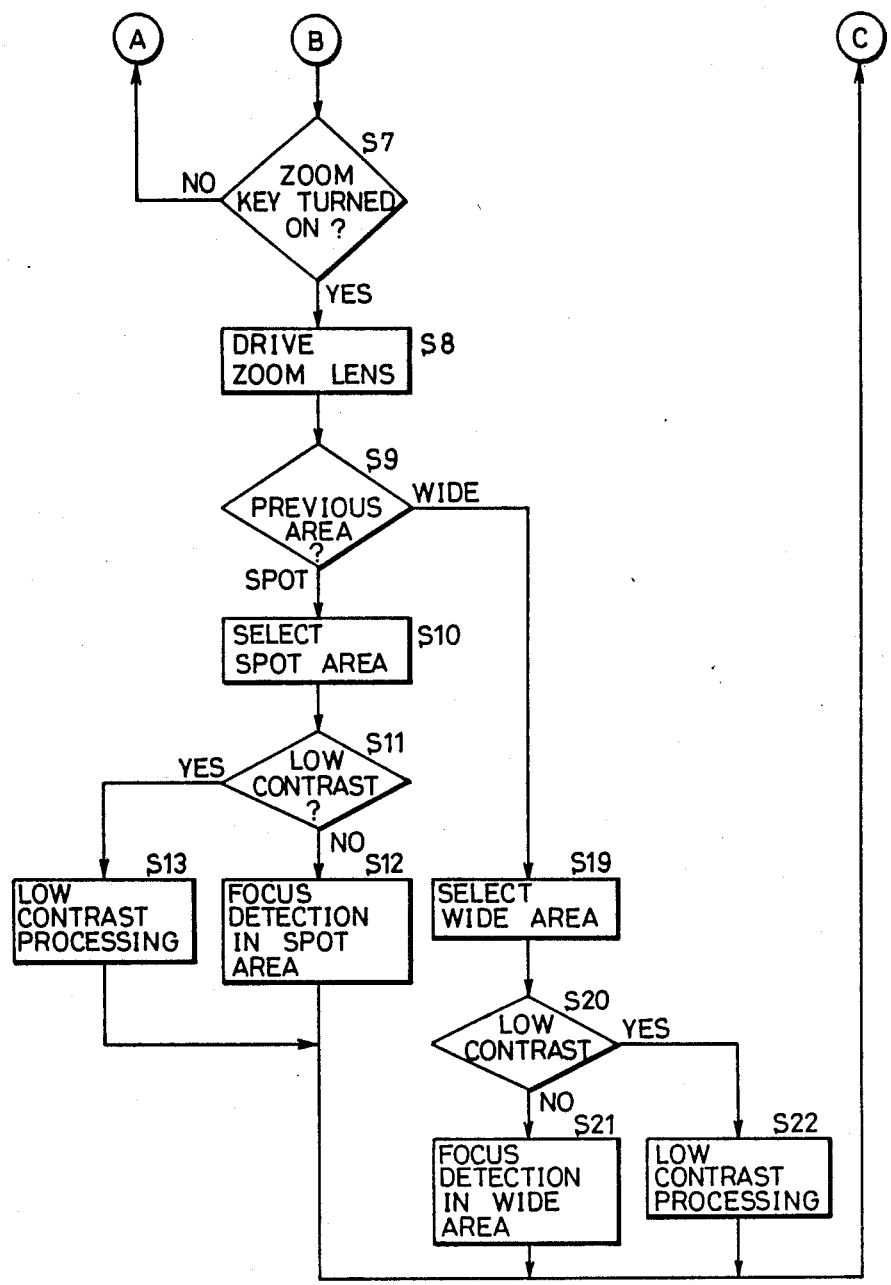

In the foregoing, the principle for determining the contrast in the selected focus detection area and switching between the focus detection areas as well as the calculation were described. Now, signal processing and control of the system controller 311 for executing the above described procedures will be described with reference to the flow charts in FIGS. 27A and 27B.

In the case of a video camera, when any of a recording button, a pause button and an instant review button (not shown) is operated, a power supply for the camera is turned on. The system controller 311 first starts auto focus (AF) operation in the step S0. Then, in the step S1, the spot area is selected for the focus detection area. Subsequently, in the step S2, checking for a low contrast in the spot area is effected, that is, it is determined whether focus detection is capable or not. If it is determined by the low contrast checking that focus detection is capable, focus detection operation for the spot area, that is, calculation of a defocus amount and a defocus direction is performed (in the step S3) and the mark QI indicating the focus detection area corresponding to the spot area (as shown in FIG. 28A) is displayed in the view finder 334 in the step S4. Subsequently, the focus lens, that is, the compensator 305 in this embodiment is driven in the step S5 to move the zoom lens unit to a in-focus position based on the result of the focus detection in the spot area (in the step S3). If an in-focus condition is already set, the focus lens is not driven.

If it is determined in the low contrast checking (in the step S2) that focus detection is incapable, the wide area is selected for the focus detection area in the step S14. Then, checking for a low contrast in the wide area is effected in the step S15. If it is determined by the checking that focus detection is capable, focus detection in the wide area is effected in the step S16 and the mark QII indicating the focus detection area corresponding to the wide area (as shown in FIG. 28B) is displayed in the view finder 334 in the step S17. Subsequently, the focus lens is driven in the step S5 based on the result of the focus detection for the wide area (in the step S16). If it is determined by the low contrast checking (in the step S15) that focus detection is incapable, an object permitting focus detection is located neither in the spot area nor in the wide area and, consequently, low contrast processing is performed in the step S18. The low contrast processing in the step S18 may be applied in various manners, for example, by a display of warning or by sound warning. After the low contrast processing in the step S18, the flow returns to the start of AF operation in the step S0 and then the above described procedures are repeated.

If focus detection is capable in the spot area or the wide area, a state of the zoom operation key 310 is read out in the step S6 after the driving of the focus lens in the step S5. If the zoom operation key 310 indicates zooming in the tele direction or in the wide direction, the state of the zoom operation key 310 is determined in the step S7, whereby the zoom lens is driven in the step S8. The zoom lens in this embodiment is the variator 304.

Then, AF operation is restarted. If the zoom lens is driven, it is determined in the step S9 whether the previously set focus detection area is the spot area or the wide area. If focus detection in the spot area is previously effected, the spot area is selected in the step S10 to effect checking for a low contrast in the step S11. If focus detection is capable, the focus detection in the spot area is performed in the step S12 and the flow returns to the step S5 to drive the focus lens. If it is determined by the low contrast checking in the step S11 that focus detection is incapable, low contrast processing is performed in the step S13. The low contrast processing may be applied by giving a warning of sound or by display, or by moving the focus lens (i.e., the compensator 305) in a predetermined direction with a predetermined speed. After the low contrast processing in the step S13, the flow returns to the step S5.

If it is determined in the step S9 that the previously set detection area is the wide area, the wide area is selected in the step S19 and checking for a low contrast is effected in the step S20. If it is determined by the checking that focus detection is capable, the focus detection in the wide area is effected in the step S21 and the flow returns to the step S5. If it is determined by the checking for a low contrast in the step S20 that focus detection is incapable, low contrast processing which is the same as in the above mentioned step S13 is performed in the step S22 and then the flow returns to the step S5. According to the above described processing flow, if zooming is started after a focus detection area indicating mark has been displayed in the step S4 or the step S17, the steps for displaying the focus detection area indicating marks are not applied thereafter and accordingly the mark displayed in the finder is not changed. In the above described processing flow, zooming may be forbidden forcedly after the low contrast processing steps S13 and S22 and the flow may return to the start of AF operation after the zooming has been forbidden.

In the above described processing, a focus detection area fixedly used during zooming is the focus detection area set immediately before the start of zooming. To the contrary, a focus detection area fixedly used during zooming may be the spot area. If the focus detection area having such a small area is set, there is an advantage that calculation for focus detection can be performed rapidly. This is because less time is required for reading and processing of data since the number of picture elements utilized in the spot area I1 is by far smaller than that in the wide area III1 as can be seen in FIG. 26. In addition, if the time required for calculation for focus detection is thus shortened, cycles for focus detection can be rapidly repeated during zooming, whereby changes in the view angle can be promptly followed up.

In the foregoing, the third embodiment of the present invention was described. However, the present invention is not limited thereto. Various changes and modifications can be made within the scope of the invention. For example, although the video camera was described in the third embodiment, it is needless to say that the invention is applicable to a conventional camera with film having a zooming function. In addition, the focusing method is not limited to the inner focusing system in the above described third embodiment and focusing of a front lens moving system may be adopted. Furthermore, although the focus detection system of a phase difference detection type is used in this embodiment, a focus detection system of a contrast detection type may be used.

Fourth embodiment:

Finally, the fourth embodiment of the present invention will be described.

Figure 29A:
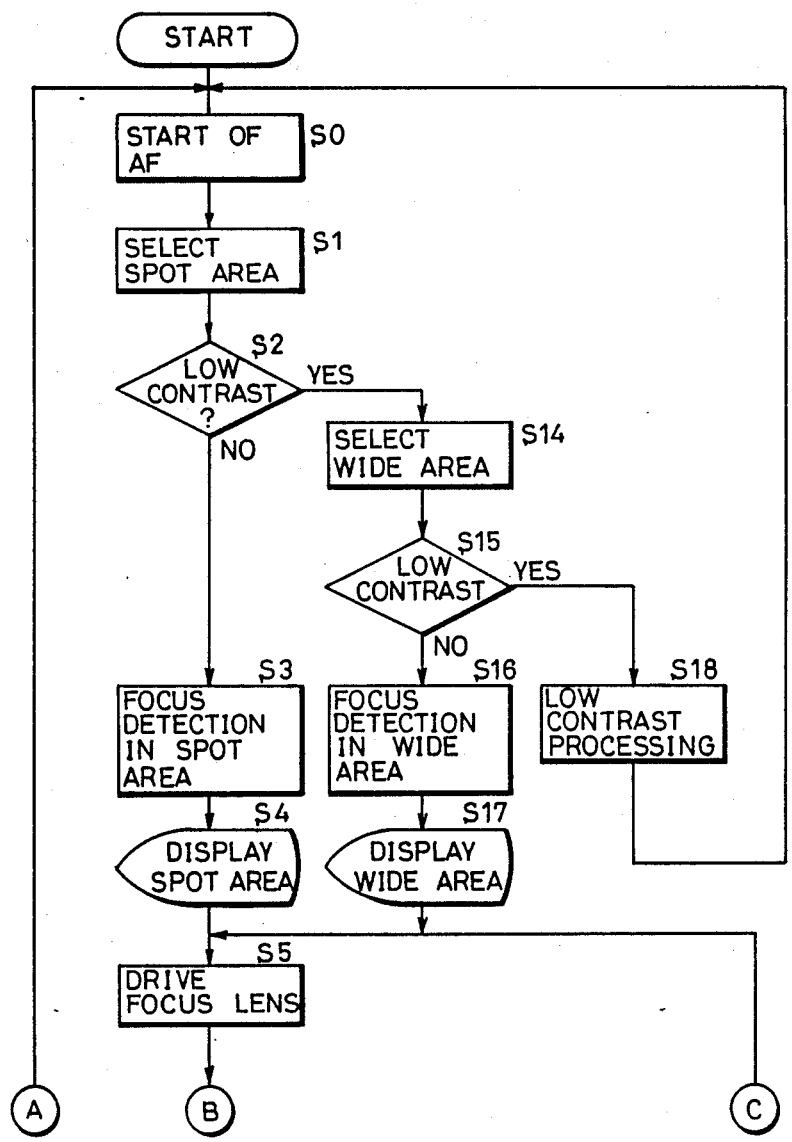
FIGS. 29A and 29B are flow charts showing signal processing and control in a system controller in a fourth embodiment of the present invention.
Figure 29:
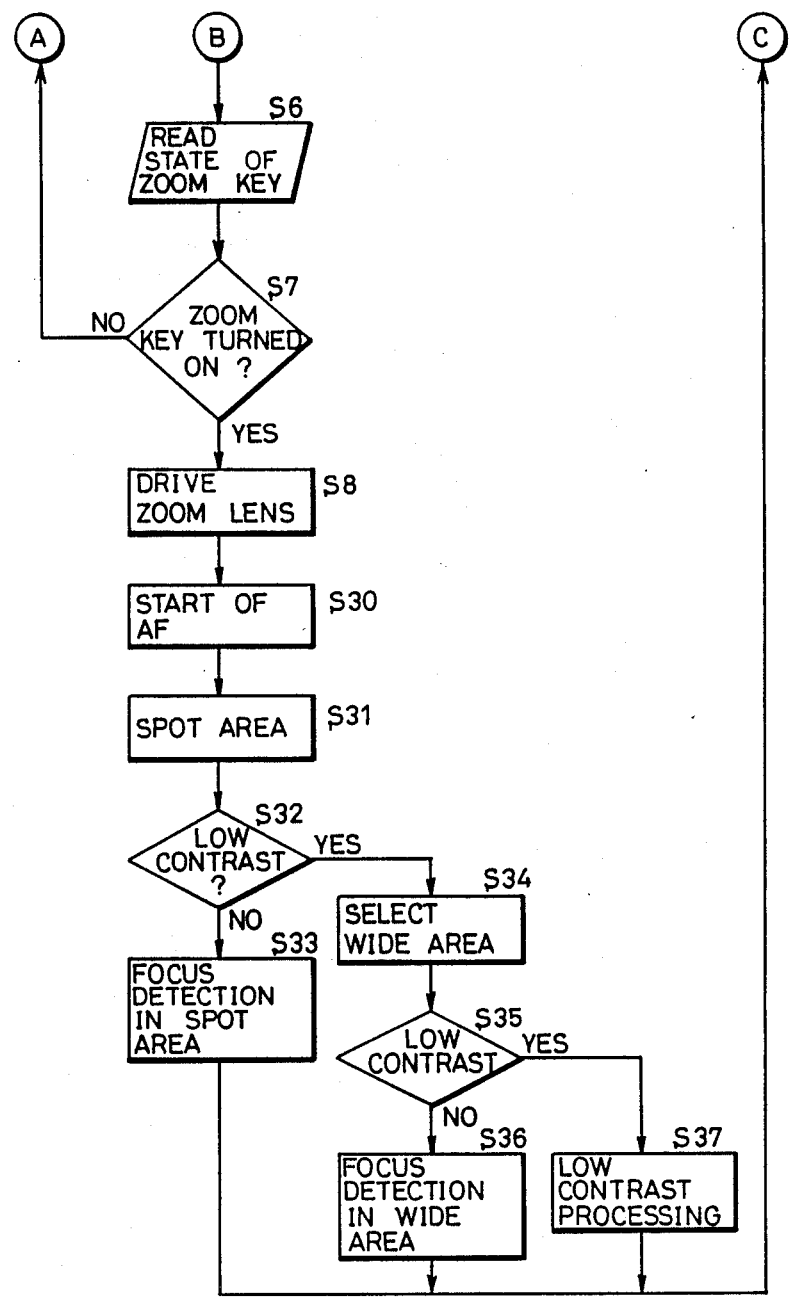

FIGS. 29A and 29B are flow charts of signal processing and control procedures of the system controller 311 in this embodiment.

This embodiment is similar to the third embodiment and FIGS. 25, 26, 28A and 28B as well as the description in connection with those figures are commonly used. However, a focus detection system during zooming in the fourth embodiment is a little different from that in the third embodiment as will be described hereinafter referring to FIGS. 29A and 29B.

In FIGS. 29A and 29B, the steps S0 to S8 and S14 to S18 are entirely the same as in the third embodiment. In the fourth embodiment, after the zoom lens is moved in the step S8, AF operation is restarted in the step S30. At this time, the spot area is selected in the step S31 and checking for a low contrast is effected in the step S32. Then, if it is determined that focus detection is capable, the focus detection in the spot area is effected in the step S33 and the flow returns to the step S5 to move the focus lens based on the result of the focus detection. If it is determined by the checking for a low contrast in the step S32 that focus detection is incapable, the focus detection area is changed to the wide area in the step S34. Subsequently, checking for a low contrast is effected in the step S35 and if it is determined that focus detection is capable, the focus detection in the wide area is effected in the step S36. Then, the flow returns to the step S5 to move the focus lens.

As described above, if zooming is started after a focus detection area indicating mark has been displayed, the steps for setting the marks in the finder are not applied thereafter and even if the focus detection area is changed between the spot area and the wide area, the mark displayed in the finder is not changed.

If it is determined by the checking for a low contrast in the step S35 that focus detection is incapable, low contrast processing is performed in the step S37. The low contrast processing in this case may be applied by visual warning display, sound warning and the like. In this fourth embodiment, after the low contrast processing in the step S37, the flow returns to the step S5 to enable zooming. However, zooming may be forbidden forcedly and in addition, after zooming has been forbidden, AF operation may be restarted.

If it is determined by the determination of the zoom operation key state in the step S7 that the zoom operation key 310 is not operated, the zoom lens is not moved and the flow returns to the step S0 for start of AF operation. Thus, focus detection is repeated and each time the focus detection area is changed, the focus detection area indicating mark displayed in the view finder is changed.

In the above described processing, the focus detection area indicating mark fixedly displayed in the view finder during zooming is the focus detection area indicating mark set immediately before the start of zooming. However, the mark displayed in the finder during zooming may be the spot area indicating mark as is different from this embodiment. If such a small detection area is set during zooming, there is an advantage that if an object image in the finder viewed by a photographer is changed, the photographer will move the camera such that the object image can be continuously caught within the center of the mark (i.e., without causing deviation due to an unsteady hold on the camera). On the other hand, if the focus detection area displaying mark has such a large area as for the wide area, a change of the object image is liable to appear within the focus detection area indicating mark and accordingly deviation due to an unsteady hold on the camera easily occurs because the photographer usually intends to catch the object suitably in sight and is liable to move the camera.

Although the fourth embodiment of the present invention was described in the foregoing, the present invention is not limited thereto. Various changes and modifications can be made within the scope of the claimed invention. For example, although the video camera was described in the fourth embodiment, it is needless to say that a conventional camera with film having a zooming function may be used. In addition, the focusing system is not limited to the inner focusing system in the fourth embodiment and a focusing system of a front lens moving type may be used. Furthermore, although the focus detection system of the phase difference detection type is used in the fourth embodiment, a focus detection system of a contrast detection type may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera having a zoom lens unit, comprising:
   light receiving means for receiving light from an object;
   a first lens fixed in a position at a predetermined forward distance from a light receiving portion of said light receiving means;
   a second lens movable between said first lens and said light receiving portion;
   first drive means for moving said second lens;
   a third lens movable between said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
   direction detecting means for detecting a moving direction of said second lens;
   movement determination means responsive to an output of said direction detecting means for determining a moving direction and a moving speed of said third lens; and
   second drive means for electrically driving said third lens based on an output of said movement determination means.

2. A camera in accordance with claim 1, further comprising
   focal length detecting means for detecting said focal length based on a position of said second lens, movement of said third lens being controlled in response to the output of said direction detecting means and an output of said focal length detecting means.

3. A camera in accordance with claim 1, further comprising
   focus detecting means for detecting a focusing condition of said third lens, movement of said third lens being controlled in response to the output of said direction detecting means and an output of said focus detecting means.

4. A camera in accordance with claim 3, wherein said focus detecting means detects a direction of said defocus with respect to said light receiving portion.

5. A camera in accordance with claim 3, wherein said focus detecting means detects an amount of defocus with respect to said light receiving portion.

6. A camera in accordance with claim 5, wherein said focus detecting means performs a detection operation repeatedly and calculates an amount of defocus obtained in the present detection cycle and a difference between amounts of said defocus obtained in the present and last detection cycles.

7. A camera in accordance with claim 3, further comprising
   focal length detecting means for detecting the focal length based on the position of said second lens, movement of said third lens being controlled in response to the outputs of said direction detection means and said focus detecting means and an output of said focal length detecting means.

8. A camera in accordance with claim 7, wherein said focus detecting means detects a direction of defocus with respect to said light receiving portion.

9. A camera in accordance with claim 7, wherein said focus detecting means detects an amount of defocus with respect to said light receiving portion.

10. A camera in accordance with claim 7, wherein said focus detecting means performs a detection operation repeatedly and calculates an amount of defocus obtained in the present detection cycle and a difference between amounts of said defocus obtained in the present and last detection cycles.

11. A camera having a zoom lens unit, comprising:
    light receiving means for receiving light from an object;
    a first lens fixed in a position at a predetermined forward distance from a light receiving portion of said light receiving means;
    a second lens movable between said first lens and said light receiving portion;
    first drive means for moving said second lens;
    a third lens movable between said said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
    change detecting means for detecting that the focal length of said zoom lens is being changed;
    defocus direction detecting means for detecting a direction of defocus with respect to said light receiving portion;
    movement determination means responsive at least to an output of said defocus direction detecting means for determining a moving speed of said third lens when said change detecting means detects that the focal length of said zoom lens unit is being changed; and second drive means for electrically driving said third lens based on an output of said movement determination means.

12. A camera in accordance with claim 11, further comprising
focal length detecting means for detecting the focal length based on a position of said second lens, movement of said third lens being controlled in response to the output of said defocus direction detecting means and an output of said focal length detecting means.

13. A camera having a zoom lens unit, comprising:
light receiving means for receiving light from an object;
a first lens fixed in a position at a predetermined forward distance from a light receiving portion of said light receiving means;
a second lens movable between said first lens and said light receiving portion;
first drive means for moving said second lens;
a third lens movable between said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
change detecting means for detecting that the focal length of said zoom lens is being changed;
defocus amount detecting means for detecting an amount of defocus with respect to said light receiving portion repeatedly;
defocus change amount detecting means for detecting a difference between amounts of said defocus detected in the present and the last detection cycles by said defocus amount detecting means;
movement determination means responsive at least to an output of said defocus amount detecting means obtained in the present detection cycle and an output of said defocus change amount detecting means for determining a moving speed of said third lens; and
second drive means for electrically driving said third lens when said change detecting means detects that the focal length of said zoom lens unit is being changed based on an output of said movement determination means.

14. A camera in accordance with claim 13, further comprising
focal length detecting means for detecting the focal length based on a position of said second lens, movement of said third lens being controlled in response to the outputs of said defocus amount detecting means and said defocus change amount detecting means and an output of said focal length detecting means.

15. A camera having a zoom lens unit, comprising:
light receiving means for receiving light from an object;
a first lens fixed in a position at a predetermined forward distance from a light receiving portion of said light receiving means;
a second lens movable between said first lens and said light receiving portion;
first drive means for moving said second lens;
a third lens movable between said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
change detecting means for detecting that the focal length of said zoom lens is being changed;
movement determination means for determining a moving speed of said third lens;
focus detecting means for detecting a focusing condition of said third lens;
speed change means for changing the determined moving speed in response to an output of said focus detecting means when the result of the focusing condition is not obtained, said determined moving speed being not changed when the result of focusing condition is obtained with the focal length being changed; and
second drive means for electrically driving said third lens based on the moving speed outputted by said speed change means.

16. A camera in accordance with claim 15, wherein the result of a focusing condition is not obtained when detection of said focusing condition is impossible.

17. A camera in accordance with claim 15, wherein the result of a focusing condition is not obtained when said second lens is moved by said first drive means before the result of said focus detecting means is outputted.

18. A camera in accordance with claim 15, further comprising
direction detecting means for detecting a moving direction of said second lens, movement of said third lens being controlled in response to an output of said direction detecting means.

19. A camera in accordanse with claim 18, further comprising
focal length detecting means for detecting said focal length based on a position of said second lens, movement of said third lens being controlled in response to the output of said direction detecting means and an output of said focal length detecting means.

20. A camera in accordance with claim 19, wherein the result of a focusing condition is not obtained when detection of said focusing condition is impossible.

21. A camera in accordance with claim 19, wherein the result of a focusing condition is not obtained when said second lens is moved by said first drive means before the result of said focus detecting means has not been outputted.

22. A camera having a zoom lens unit, comprising:
light receiving means for receiving light from an object;
a first lens fixed in a position at a predetermined forward distance from a light receiving portion of said light receiving means;
a second lens movable between said first lens and said light receiving portion;
first drive means for moving said second lens;
a third lens movable between said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
change detecting means for detecting that the focal length of said zoom lens is being changed;

movement determination means responsive to an output of said change detecting means for determining a moving direction and a moving speed of said third lens;

focus detecting means for detecting a focusing condition of said second lens;

first speed change means responsive to an output of said focus detecting means for changing said determined moving speed;

second speed change means for further changing said changed moving speed to said determined moving speed when a specified change occurs in the movement of said second lens, and maintaining the moving speed outputted by said first speed change means when said specified change does not occur;

second drive means for electrically driving said third lens based on the moving speed outputted by said second speed change means.

23. A camera in accordance with claim 22, further comprising
direction detecting means responsive to an output of said change detecting means for detecting a moving direction of said second lens, said specified change being effected when the moving direction of said second lens detected by said direction detecting means is changed.

24. A camera in accordance with claim 22, wherein a movable range of said second lens is divided into a plurality of zones, said camera further comprising
zone detecting means for detecting any of said zones where said second lens exits, said specified change being effected when the zone detected by said zone detecting means is changed.

25. A camera in accordance with claim 22, further comprising
direction detecting means responsive to the output of said change detecting means for detecting a moving direction of said second lens, movement of said third lens being controlled in response to an output of said direction detecting means.

26. A camera in accordance with claim 25, further comprising
focal length detecting means for detecting said focal length based on a position of said second lens, movement of said third lens being controlled in response to the output of said direction detecting means and an output of said focal length detecting means.

27. A camera in accordance with claim 26, wherein said specified change is effected when the moving direction of said second lens detected by said direction detecting means is changed.

28. A camera in accordance with claim 26, wherein a movable range of said second lens is divided into a plurality of zones, said camera further comprising
zone detecting means for detecting any of said zones where said second lens exists, said specified change being effected when the zone detected by said zone detecting means is changed.

29. A camera having a zoom lens unit, comprising:
light receiving means for receiving light from an object;
a first lens fixed in a position at a predetermined forward distance from a light receiving portion of said light receiving means;
a second lens movable between said first lens and said light receiving portion;
first drive means for moving said second lens;
a third lens movable between said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
change detecting means for detecting that the focal length of said zoom lens is being changed;
focus detecting means including
light receiving means having an image pickup member of a charge accumulation type for receiving, in said image pickup member, at least part of light from said object to convert the received light to an electric signal,
control means for controlling a charge accumulation period for receiving said light in said image pickup member within a range of a predetermined period,
detecting means for detecting a focusing condition of said third lens based on said electric signal accumulated within said charge accumulation period, and
limiting means responsive to an output of said change detecting means for limiting said charge accumulation period controlled by said control means to a period shorter than said predetermined period; and
second drive means for electrically driving said third lens based on an output of said focus detecting means.

30. A camera in accordance with claim 29, wherein said second drive means controls a moving direction and a moving speed of said third lens based on the output of said focus detecting means.

31. A camera having a zoom lens unit, comprising:
light receiving means for receiving light from an object;
a first lens fixed in a position at a predetermined forward distance from a light receiving portion of said light receiving means;
a second lens movable between said first lens and said light receiving portion;
first drive means for moving said second lens;
a third lens movable between said second lens and said light receiving portion, said first, second and third lenses constituting said zoom lens unit, movement of said second lens by said first drive means changing a focal length of said zoom lens unit, and movement of said third lens adjusting a focusing of said zoom lens unit;
change detecting means for detecting that the focal length of said zoom lens is being changed;
focus detecting means including
light receiving means having an image pickup member of a charge accumulation type for receiving, in said image pickup member, at least part of light from said object to convert the received light into an electric signal,
control means for controlling a charge accumulation period for receiving said light in said image pickup member within a range of a predetermined period,
detecting means for detecting a focusing condition of said third lens based on said electric signal accumulated within said charge accumulation period, and detection time regulating means for forbidding the start of next light receiving operation by said light receiving means until a sum of an operation period required for detecting the focusing condition based on said electric signal and said charge accumulation period attains a predetermined time when said sum is less than said predetermined time; and second drive means for electrically driving said third lens based on an output of said focus detecting means.

32. A camera in accordance with claim 31, wherein said second drive means controls a moving direction and a moving speed of said third lens based on the output of said focus detecting means.

33. A camera having a zoom lens unit, comprising:
a first lens driven to change a focal length of said zoom lens unit;
a second lens driven to adjust a focusing;
an image pickup means having a first light receiving area and a second light receiving area for receiving light from an object passing through said first and second lenses;
change detecting means for detecting that said focal length is being changed;
focus detecting means including
  first detecting means for detecting a focusing condition based on the received light in said first light receiving area,
  second detecting means for detecting a focusing condition based on the received light in said second light receiving area,
  detection selecting means for selecting either said first detecting means or said second detecting means,
  switching means for switching from the selected one of said first and second detecting means to the other detecting means, and
  switching limiting means responsive to an output of said change detecting means for forbidding the switching by said switching means; and
drive means responsive to an output of said focus detecting means for electrically driving said second lens.

34. A camera in accordance with claim 33, wherein said switching means switches to said second or first detecting means when the focus detection by said first or second detecting means selected is incapable.

35. A camera in accordance with claim 34, further comprising
display means for displaying said first or second area corresponding to said first or second detecting means selected by said detection selecting means.

36. A camera in accordance with claim 33, wherein said first light receiving area is smaller than said second light receiving area and said detection selecting means selects said first detecting means in response to the output of said change detecting means.

37. A camera in accordance with claim 33, further comprising
light receiving means for receiving light from said object, and
a third lens fixed in a position at a predetermined forward distance from a light receiving portion of said light receiving means, said first and second lens being located between said third lens and said light receiving portion.

38. A camera having a zoom lens unit, comprising:
a first lens driven to change a focal length of said zoom lens unit;
a second lens driven to adjust a focusing;
an image pickup means having a first light receiving area and a second light receiving area for receiving light from an object passing through said first and second lenses;
change detecting means for detecting that said focal length is being changed;
focus detecting means including
  first detecting means for detecting a focusing condition based on the received light in said first light receiving area,
  second detecting means for detecting a focusing condition based on the received light in said second light receiving area,
  detection selecting means for selecting either said first detecting means or said second detecting means, and
  switching means for switching to said second or first detecting means when detection by said first or second detecting means selected is incapable;
display means for displaying said first or second light receiving area corresponding to said first or second detecting means selected by said detection selecting means;
display control means responsive to an output of said change detecting means for maintaining the display of said first or second light receiving area in said display means, irrespective of switching by said switching means; and
drive means responsive to an output of said focus detecting means for electrically driving said second lens.

39. A camera in accordance with claim 38, wherein said first light receiving area is smaller than said second light receiving area and said detection selecting means selects said first detecting means in response to the output of said change detecting means.

40. A camera in accordance with claim 38, further comprising
light receiving means for receiving light from said object, and
a third lens fixed in a position at a predetermined forward distance from a light receiving portion of said light receiving means, said first and second lens being located between said third lens and said light receiving portion.

* * * * *